United States Patent
Kao et al.

(10) Patent No.: US 12,104,706 B2
(45) Date of Patent: Oct. 1, 2024

(54) FLUID PRESSURE PROPORTIONAL VALVE

(71) Applicant: GENN DIH ENTERPRISE CO., LTD., Taichung (TW)

(72) Inventors: Hsiu-Ling Kao, Taichung (TW); Chia-Mou Wu, Taichung (TW); Cheng-Pei Wu, Taichung (TW)

(73) Assignee: GENN DIH ENTERPRISE CO., LTD., Taichung (TW)

( * ) Notice: Subject to any disclaimer, the term of this patent is extended or adjusted under 35 U.S.C. 154(b) by 519 days.

(21) Appl. No.: 17/522,665

(22) Filed: Nov. 9, 2021

(65) Prior Publication Data
US 2023/0022254 A1    Jan. 26, 2023

(30) Foreign Application Priority Data
Jul. 22, 2021    (CN) .......................... 202121674177.1

(51) Int. Cl.
| | |
|---|---|
| *F16K 11/16* | (2006.01) |
| *F16K 11/048* | (2006.01) |
| *F16K 11/24* | (2006.01) |
| *F16K 37/00* | (2006.01) |
| *G05D 16/20* | (2006.01) |

(52) U.S. Cl.
CPC .......... *F16K 11/161* (2013.01); *F16K 37/005* (2013.01); *G05D 16/2006* (2013.01); *F16K 11/048* (2013.01); *F16K 11/24* (2013.01); *G05D 16/202* (2013.01); *G05D 16/2024* (2019.01)

(58) Field of Classification Search
CPC .............. G05D 16/2006; G05D 16/202; F16K 11/161; F16K 11/16; F16K 11/048; F16K 11/24; F16K 37/005; Y10T 137/8662; Y10T 137/867
USPC ....................................... 137/625.65, 625.68
See application file for complete search history.

(56) References Cited

U.S. PATENT DOCUMENTS

| | | | | |
|---|---|---|---|---|
| 2,645,450 | A | * | 7/1953 | Chessman ............. F16K 27/041 137/625.68 |
| 2,651,324 | A | * | 9/1953 | Hodgson ............. F15B 13/0821 137/625.68 |
| 2,806,481 | A | * | 9/1957 | Faust ................... G05D 16/163 137/484.8 |
| 2,996,078 | A | * | 8/1961 | Freeman ................. F15B 13/04 137/625.68 |

(Continued)

*Primary Examiner* — William M McCalister
(74) *Attorney, Agent, or Firm* — Apex Juris, pllc; R. Lynette Wylie

(57) ABSTRACT

A fluid pressure proportional valve includes a valve body, a first core shaft, a second core shaft, and a driving motor. The valve body has a first orifice, a second orifice, a third orifice, and a receiving space having a valve port. The first and second core shafts are located in the receiving space. The first core shaft has a sealing portion, an abutting portion, and a flow channel. Under normal status, the sealing portion seals the valve port, and the second orifice communicates with the third orifice via the flow channel. When the driving motor drives the second core shaft to move along an axial direction, the second core shaft could seal the flow channel to block the communication between the second orifice and the third orifice and push the abutting portion of the first core shaft to depart from the valve port and the sealing portion, thereby communicating the first and the second orifices.

20 Claims, 20 Drawing Sheets

(56) References Cited

U.S. PATENT DOCUMENTS

| | | | | |
|---|---|---|---|---|
| 3,252,471 | A * | 5/1966 | Olson | G05D 16/0672 92/49 |
| 3,902,524 | A * | 9/1975 | Stoltman | F02C 9/22 137/625.68 |
| 4,579,145 | A * | 4/1986 | Leiber | G05D 16/2024 137/625.65 |
| 4,809,749 | A * | 3/1989 | Ichihashi | F16K 31/0613 137/625.68 |
| 5,377,720 | A * | 1/1995 | Stobbs | F15B 13/0402 137/625.68 |
| 5,592,972 | A * | 1/1997 | Niethammer | F15B 13/0402 137/625.68 |
| 5,778,932 | A * | 7/1998 | Alexander | G05D 16/2024 137/625.68 |
| 6,269,827 | B1 * | 8/2001 | Potter | F15B 13/0402 251/129.08 |
| 6,289,921 | B1 * | 9/2001 | Neuhaus | F16K 27/041 137/625.68 |
| 7,073,533 | B2 * | 7/2006 | Bruck | G05D 16/2024 137/625.68 |
| 8,397,758 | B2 * | 3/2013 | Hillesheim | G05D 16/2024 137/625.68 |
| 9,709,994 | B2 * | 7/2017 | Vogt | G05D 16/0672 |
| 2004/0256012 | A1 * | 12/2004 | Bruck | G05D 16/2024 137/625.65 |
| 2007/0246112 | A1 * | 10/2007 | Aranovich | F15B 13/0835 137/625.65 |
| 2008/0203342 | A1 * | 8/2008 | Ryuen | F16K 31/0613 251/129.15 |
| 2009/0057588 | A1 * | 3/2009 | Reilly | F16K 3/26 251/129.15 |
| 2009/0224192 | A1 * | 9/2009 | Oikawa | F16K 31/0613 251/129.15 |
| 2012/0118418 | A1 * | 5/2012 | Reilly | F16K 27/048 137/625.65 |
| 2014/0311333 | A1 * | 10/2014 | Hutzelmann | F01L 1/3442 91/418 |
| 2017/0306946 | A1 * | 10/2017 | Frick | F04B 9/109 |

* cited by examiner

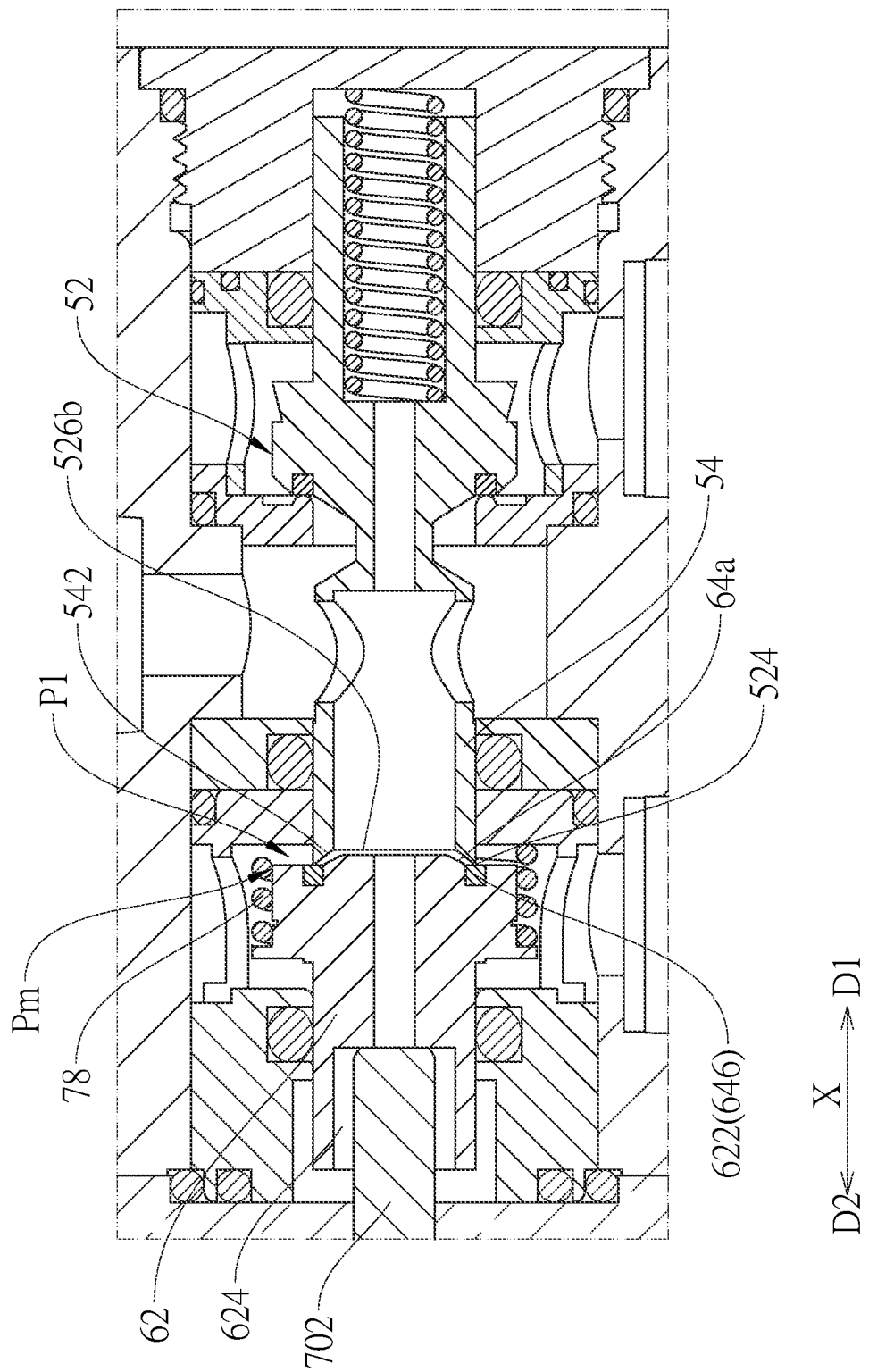
F I G. 18

FLUID PRESSURE PROPORTIONAL VALVE

BACKGROUND OF THE INVENTION

Technical Field

The present invention relates generally to a fluid switching device, and more particularly to a fluid pressure proportional valve.

Description of Related Art

A fluid switching valve is disposed to a device, wherein a pressure of the device needs to be controlled. The fluid switching valve is connected to a pressure source for regulating the pressure of the device (namely increasing or releasing the pressure of the device). There are different flow channels in a valve body of a conventional fluid switching valve, including a flow channel for increasing pressure and a flow channel for releasing pressure. Besides, a plurality of solenoid valves is disposed in the valve body for switching between the flow channels to carry out either increasing pressure or releasing pressure. When the pressure needs to be increased, the flow channel for increasing pressure is opened and the flow channel for releasing pressure is closed. When the pressure needs to be released, the flow channel for releasing pressure is opened, and the flow channel for increasing pressure is closed.

Since the plurality of solenoid valves needs to be controlled separately to switch between increasing pressure and releasing pressure. Therefore, a control device of the fluid switching valve needs to accurately control the solenoid valves (e.g. timing of opening or closing the solenoid valves) to allow the solenoid valves to work jointly, so that the difficulty and complexity of control are increased.

BRIEF SUMMARY OF THE INVENTION

In view of the above, the primary objective of the present invention is to provide a fluid pressure proportional valve which could improve a disadvantage of a conventional fluid switching valve that has a plurality solenoid valves having to be controlled separately.

The present invention provides a fluid pressure proportional valve, including a valve body, a first core shaft, a second core shaft, and a driving motor.

The valve body has a receiving space, a first orifice, a second orifice, and a third orifice. The receiving space includes a first space, a second space, and a third space which are distributed along an axial direction. The first orifice communicates with the first space. The second orifice communicates with the second space. The third orifice communicates with the third space. The receiving space has a valve port which is located between the first space and the second space.

The first core shaft is located in the receiving space of the valve body and is movable between a first position and a second position along the axial direction. The first core shaft has a sealing portion and an abutting portion. The sealing portion is located in the first space. The abutting portion is located in the second space. When the first core shaft is located at the first position, the sealing portion abuts against and the valve port. The abutting portion is pushed to drive the first core shaft to move to the second position. When the first core shaft is located at the second position, the sealing portion departs from the valve port to open the valve port. The first core shaft has a flow channel, and a first opening of the flow channel communicates with the second space. A second opening of the flow channel communicates with the third space in a way that is able to be blocked.

The second core shaft is located at the receiving space of the valve body and is movable between a third position and a fourth position along the axial direction, wherein the second core shaft has a pushing portion. When the second core shaft is located at the third position, the second opening of the flow channel communicates with the third space. When the second core shaft is located at the fourth position, the second core shaft blocks the second opening, and the pushing portion of the second core shaft pushes the abutting portion of the first core shaft to drive the first core shaft to move to the second position.

The driving motor is engaged with the valve body and has a driving shaft, wherein the driving shaft drives the second core shaft to move from the third position to the fourth position.

With such design, merely by the driving motor, the second core shaft is driven to push the first core shaft to change the pathways of the fluid in the valve body. Therefore, the inconvenience of controlling several solenoid valves of the conventional fluid switching valve is solved effectively.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 18 is similar to FIG. 9, showing the second core shaft is moved to the middle position;

DETAILED DESCRIPTION OF THE INVENTION

Figure 1:
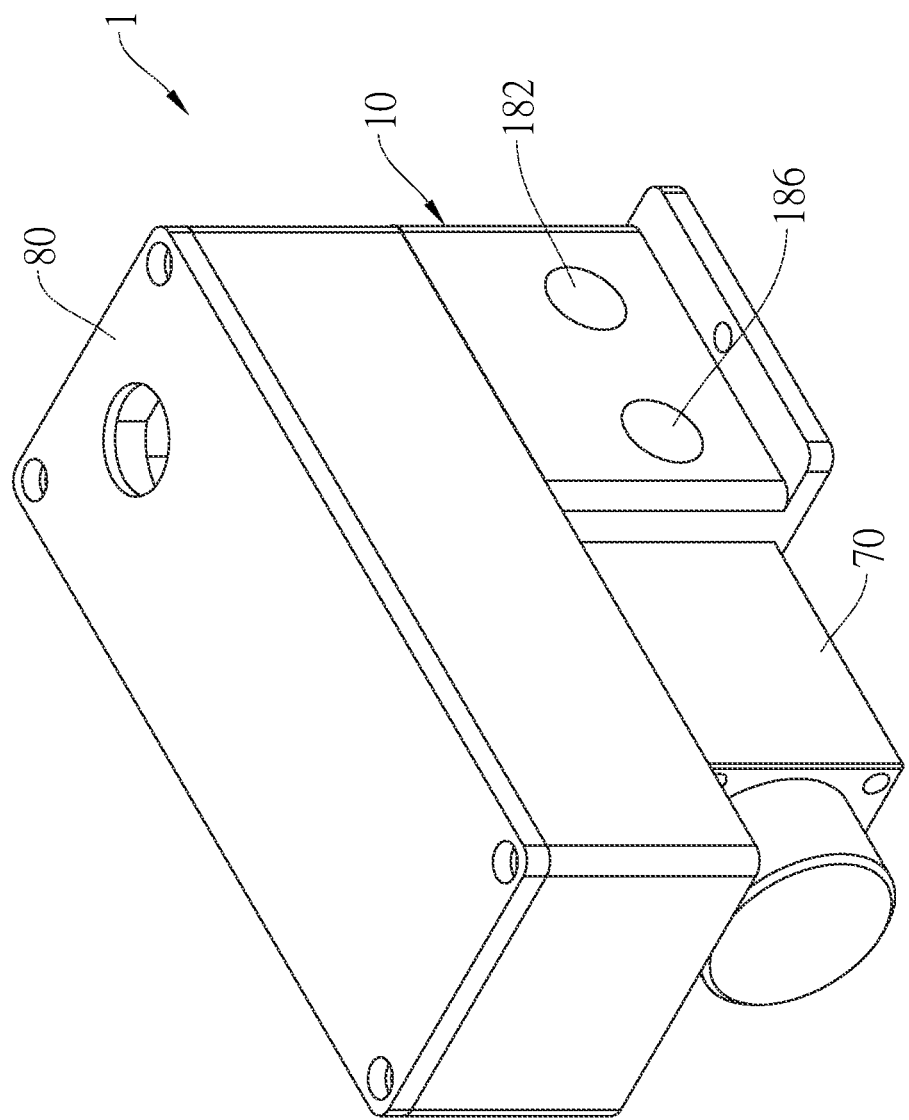
FIG. 1 is a perspective view of the fluid pressure proportional valve of a first embodiment according to the present invention.
Figure 2:
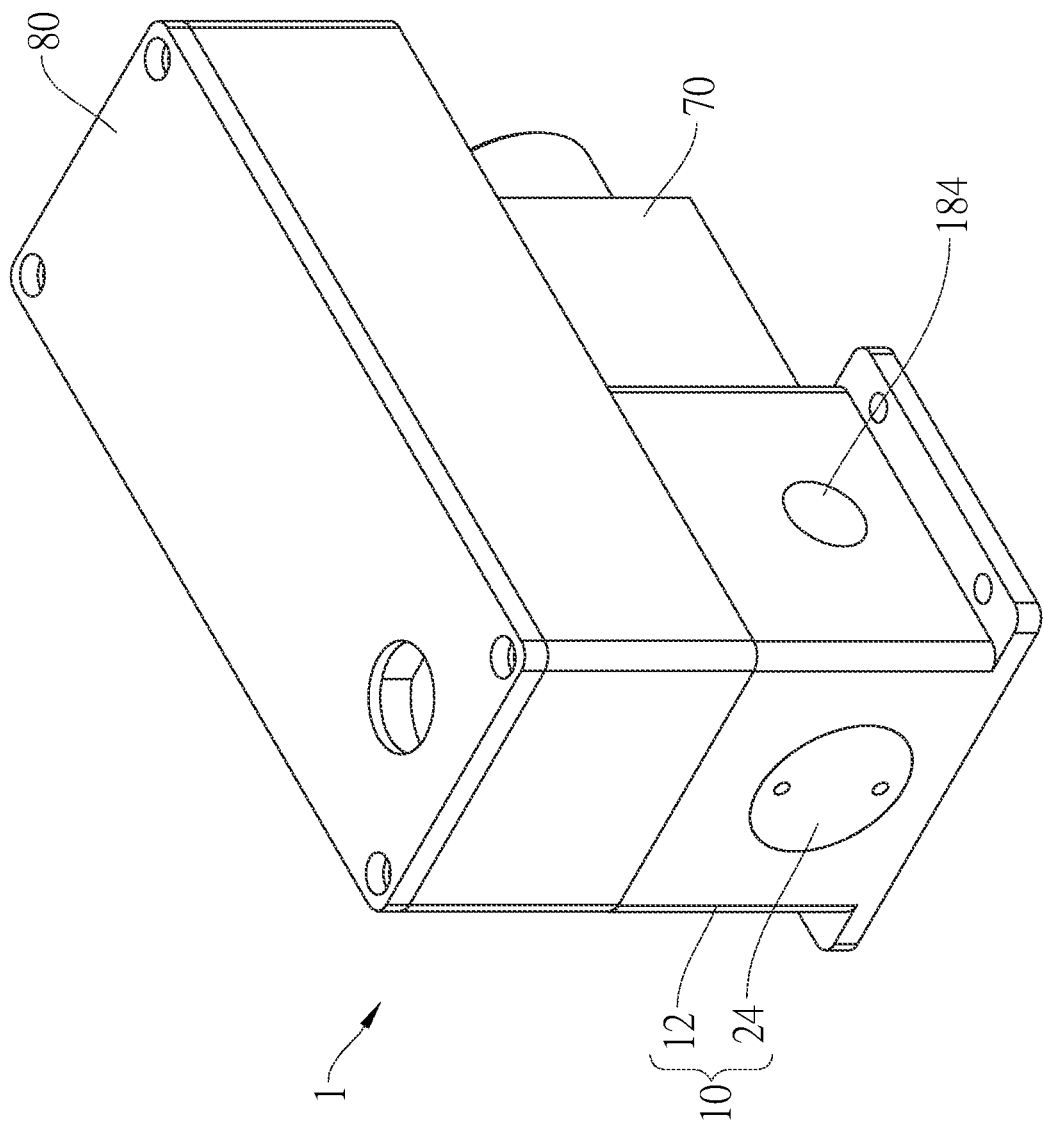
FIG. 2 a perspective view of the fluid pressure proportional valve of the first embodiment according to the present invention seen from another direction.
Figure 3:
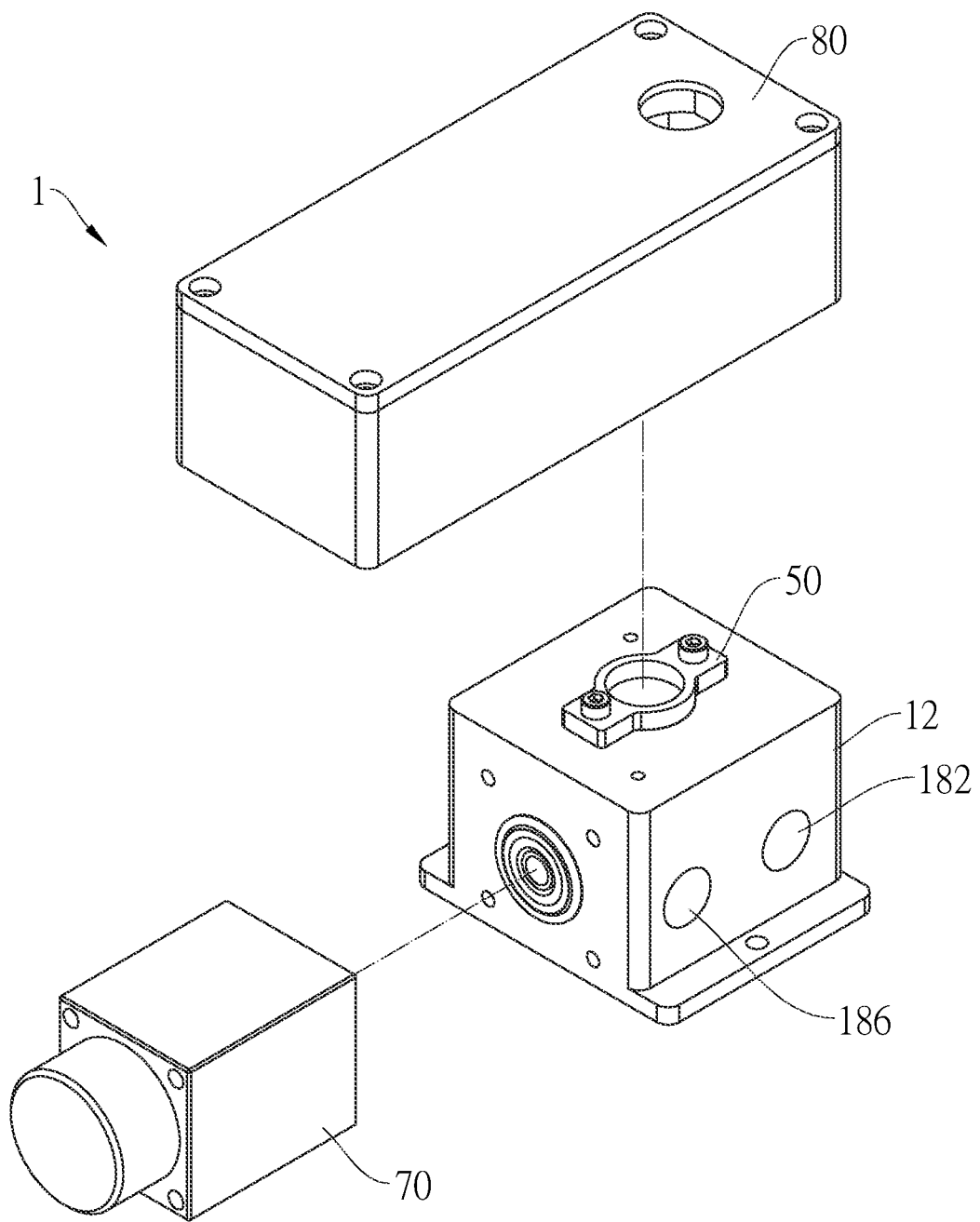
FIG. 3 is an exploded view of the fluid pressure proportional valve of the first embodiment according to the present invention.
Figure 4:
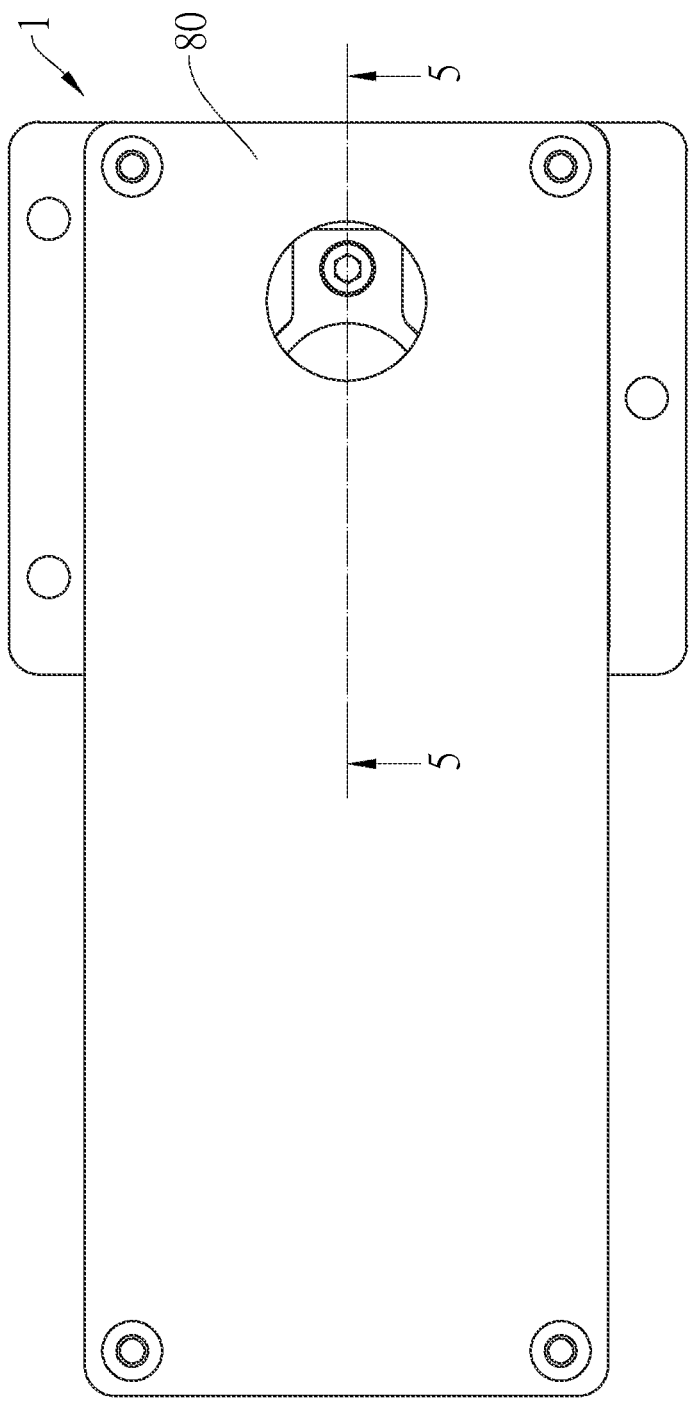
FIG. 4 is a top view of the fluid pressure proportional valve of the first embodiment according to the present invention.
Figure 5:
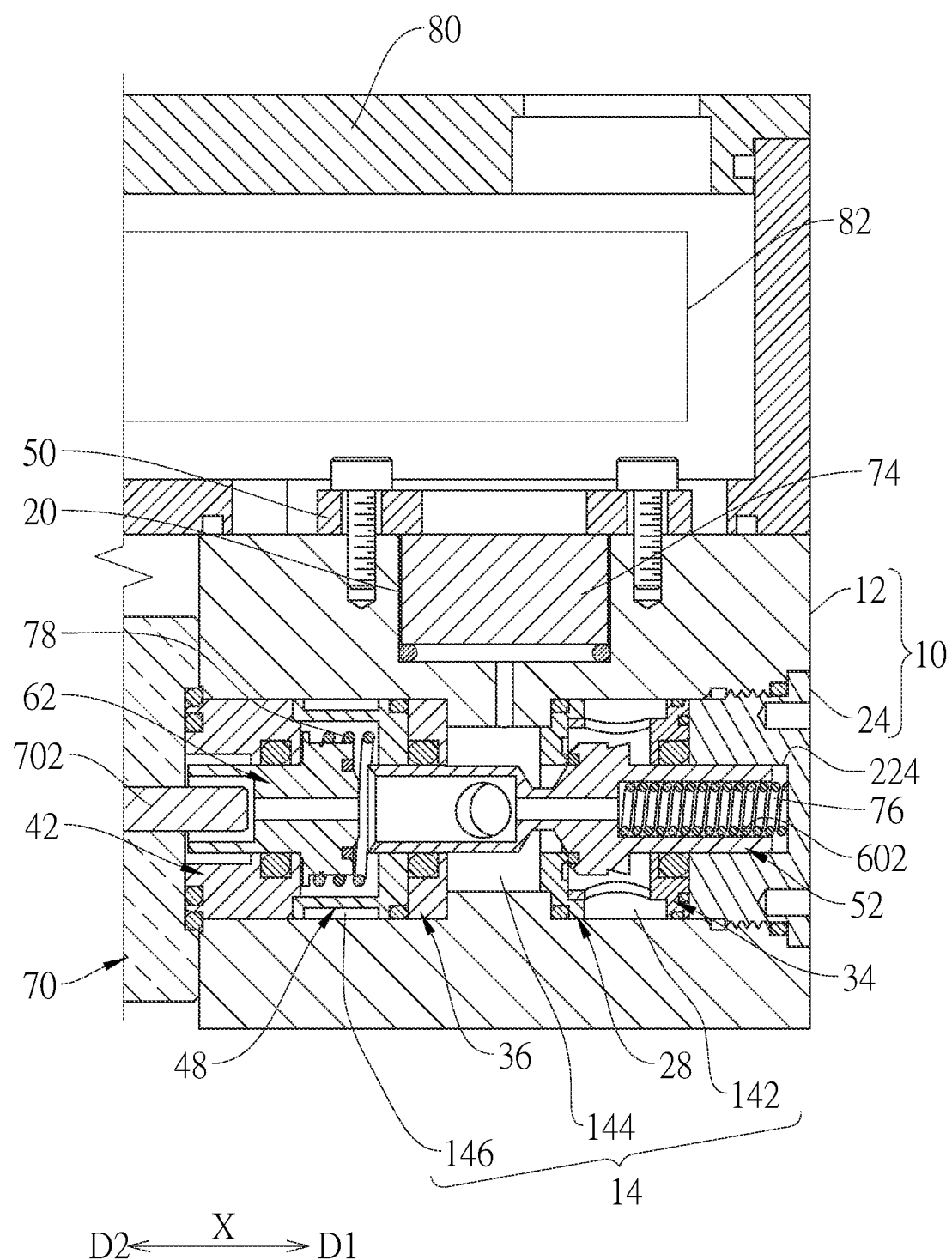
FIG. 5 is a sectional view taken along the 5-5 line in FIG. 4.
Figure 6:
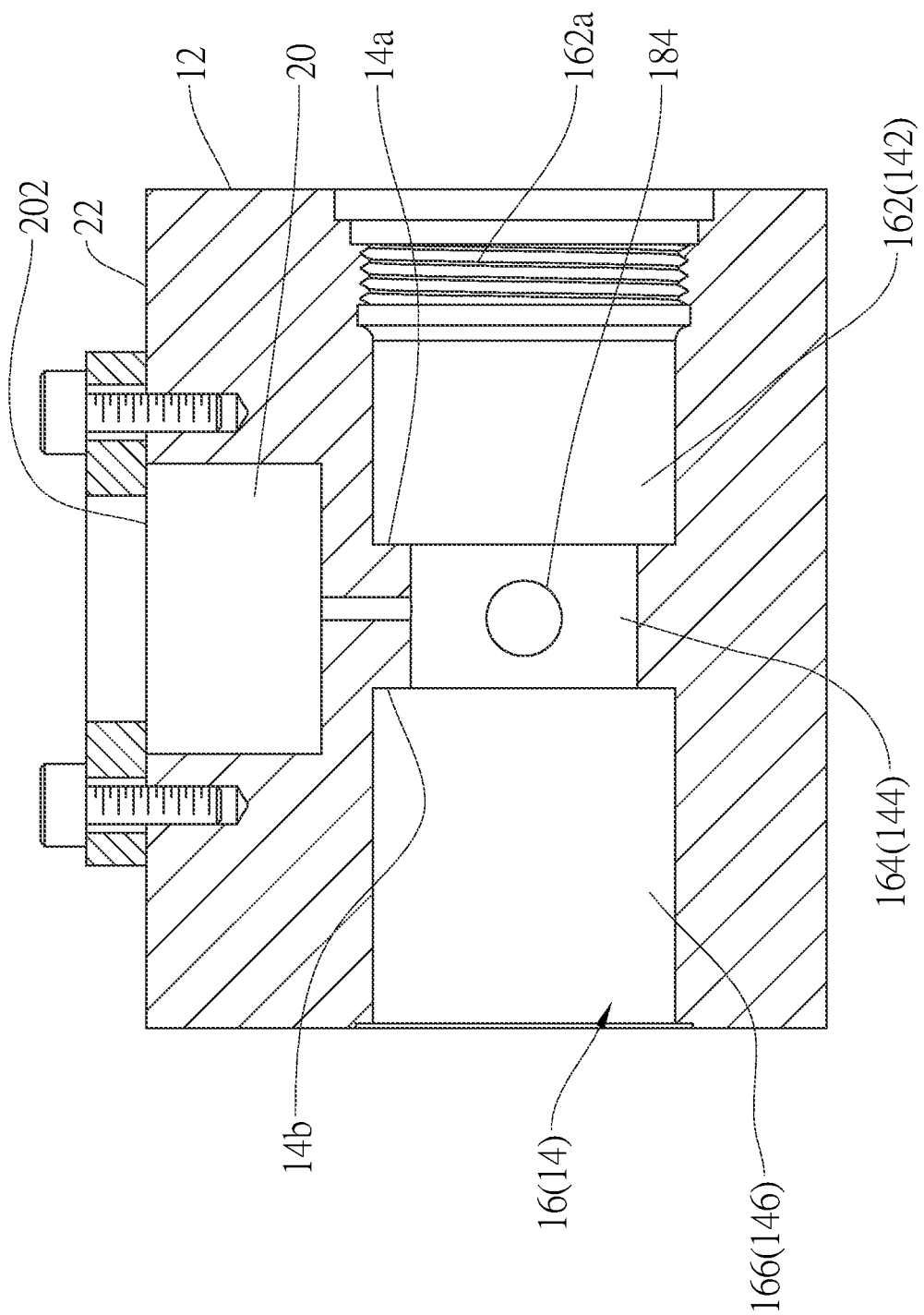
FIG. 6 is a sectional view of the main body in FIG. 5.
Figure 7:
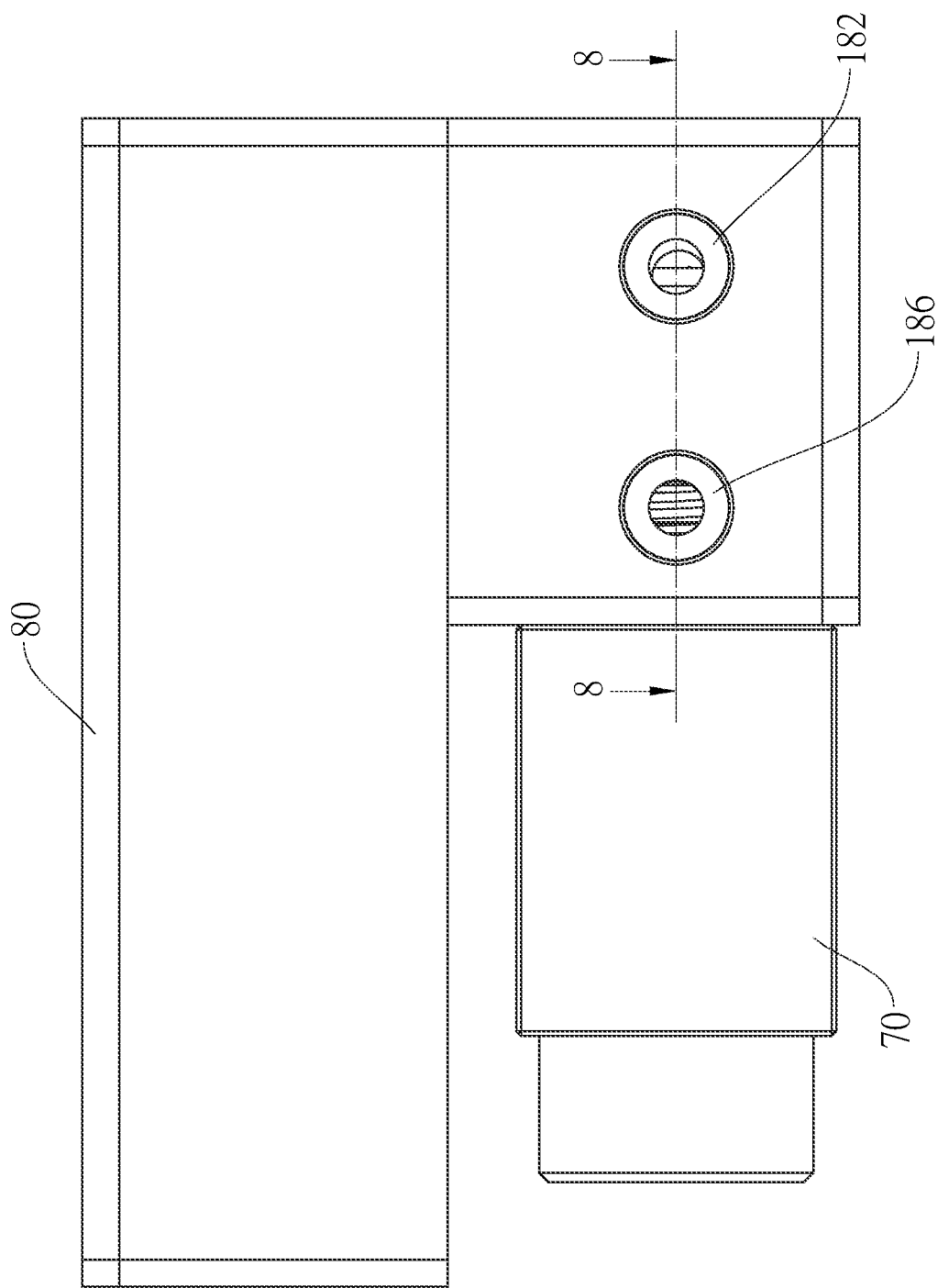
FIG. 7 is a side view of the fluid pressure proportional valve of the first embodiment according to the present invention.

As illustrated in FIG. 1 to FIG. 19, a fluid pressure proportional valve 1 of a first embodiment according to the present invention includes a valve body 10, a first core shaft 52, a second core shaft 62, and a driving motor 70. In the current embodiment, a fluid is a gas as an example, but it is not limited to gas. The fluid could be liquid as well.

As illustrated in FIG. 1 to FIG. 11, the valve body 10 includes a main body 12, wherein the main body 12 has a receiving space 14 inside. The receiving space 14 includes a first space 142, a second space 144, and a third space 146 which are distributed along an axial direction X. More specifically, the main body 12 has two side walls on the axial direction X which are opposite to each other, wherein a through hole 16 bored through the two side walls of the main body 12 along the axial direction X to form the receiving space 14, wherein the through hole 16 has a first section 162, a second section 164, and a third section 166. The first section 162, the second section 164, and the third section 166 of the through hole 16 constitute the first space 142, the second space 144, and the third space 146 of the receiving space 14, respectively. The second section 164 is located between the first section 162 and the third section 166, wherein an inner radius of the second section 164 is smaller than that of either the first section 162 or the third section 166, so that a first shoulder 14a and a second shoulder 14b, which face opposite directions, are formed on a wall of the receiving space 14. The first shoulder 14a and the second shoulder 14b face outwardly respectively. A section of the first section 162 of the through hole 16, which is near to outside, has an internal thread 162a.

The valve body 10 includes a seal cap 24, wherein the seal cap 24 has an external thread 242 which is adapted to be engaged with the internal thread 162a of the first section 162. An O-ring 26 fits around to the seal cap 24 to enhance the tightness between the seal cap 24 and the main body 12. By using the seal cap 24, a side of the first space 142 could be sealed. A cavity 244 is formed by recessing into the seal cap 24 along the axial direction X.

Another two side walls of the main body 12 have a first orifice 182, a second orifice 184, and a third orifice 186. In the current embodiment, the another two side walls are opposite to each other, wherein the first orifice 182 and the second orifice 184 are bored on the same one of the another two side walls, and the third orifice 186 is bored on the other one of the another two side walls. The first orifice 182 communicates with the first space 142, the second orifice 184 communicates with the second space 144, and the third orifice 186 communicates with the third space 146.

As illustrated in FIG. 5 to FIG. 11, the receiving space 14 has a valve port 302, wherein the valve port 302 is located between the first space 142 and the second space 144. In the current embodiment, the first shoulder 14a of the receiving space 14 is disposed with a sealing member (called as a first sealing member 28 hereinafter). The first sealing member 28 includes a gasket 30 and an O-ring 32. The O-ring 32 fits around a circumference of the gasket 30 and abuts against the wall of the first space 142 to seal. A central portion of the gasket 30 has the valve port 302, wherein the valve port 302 allows the first space 142 and the second space 144 which are respectively located at two sides of the gasket 30 to communicate to each other in a way that the communication therebetween could be operably blocked. A peripheral portion of the valve port 302 has a protruding edge 302a, wherein the protruding edge 302a extends toward the first space 142 and back to the first shoulder 14a.

A shaft seat is disposed in the receiving space 14 at a side of the seal cap 24, wherein the first shaft seat 34 has a shaft bore 342 and a groove 344 which communicate to each other, the shaft bore 342 communicates with the cavity 244 of the seal cap 24. A circumference of the first shaft seat 34 has a plurality of side holes 346 which communicate with the groove 344, so that the groove could communicate with the first orifice 182. The first shaft seat 34 abuts against the gasket 30 of the first sealing member 28. A side of the first shaft seat 34 which is opposite to the groove 344 is disposed with an O-ring 35, wherein the O-ring 35 tightly fits around the seal cap 24.

A sealing member (called a second sealing member 36 hereinafter) is disposed at the first shoulder 14a of the receiving space 14. The second sealing member 36 is located between the second space 144 and the third space 146. The second sealing member 36 has a perforation 362. In the current embodiment, the second sealing member 36 includes a gasket 38 and an O-ring 40. A side of the gasket 38 abuts against the second shoulder 14b, another side of the gasket 38 has a recess 382. The gasket 38 has a hole 384. The O-ring 40 is disposed in the recess 382. The hole 384 of the gasket 38 and an inner ring of the O-ring 40 jointly constituted the perforation 362 of the sealing member 36

The third space 146 of the receiving space 14 is disposed with a shaft seat (called a second shaft seat 42 hereinafter), the second shaft seat 42 has a shaft bore 44 which passes through two ends of the second shaft seat 42. The shaft bore 44 has a first section 442 and a second section 444. An inner radius of the first section 442 is smaller than an inner radius of the second section 44. An annular groove 442a is formed by recessing into an inner wall of the first section 442. An O-ring 46 is disposed in the annular groove 442a. A bore edge 442b of the first section 442 has a curved surface that facilitates the O-ring 26 to be plugged into the annular groove 442a.

The third space 146 of the receiving space 14 is disposed with a spring seat 48, wherein an end of the spring seat 48 has a hole 482, and another end of the spring seat 48 has a groove 484. The groove 484 communicates with the hole 482. An circumference of the spring seat 48 has two notches 486, wherein the two notches 486 communicates with the groove 484 to allow the groove 484 to communicate with the third orifice 186. In an embodiment, the notches 486 could be side holes as well, wherein a number of the notches 486 or the side holes could be one or more than three. The spring seat 48 abuts against the second sealing member 36. The spring seat 48 is fitted around by an O-ring 49 and abuts against the gasket 38 of the second sealing member 36 could be fixed to or integrally formed with the main body 12 as a monolithic unit.

A main body 12 of the valve body 10 includes a capacitive chamber 20, wherein the capacitive chamber 20 communicates with the second space 144 and has an opening 202. The opening 202 is formed on a surface 22 of the main body 12 of the valve body 10. The capacitive chamber 20 is disposed with a pressure sensor 74 inside, wherein the pressure sensor 74 is disposed in the capacitive chamber 20 through the opening 202. In the current embodiment, a fastener is a fixing ring 50 as an example. The fixing ring 50 is engaged with the surface 22 of the valve body 10 and is located at the opening 202. The fixing ring 50 abuts against the pressure sensor 74 to fix the pressure sensor 74 in the capacitive chamber 20.

Figure 9:
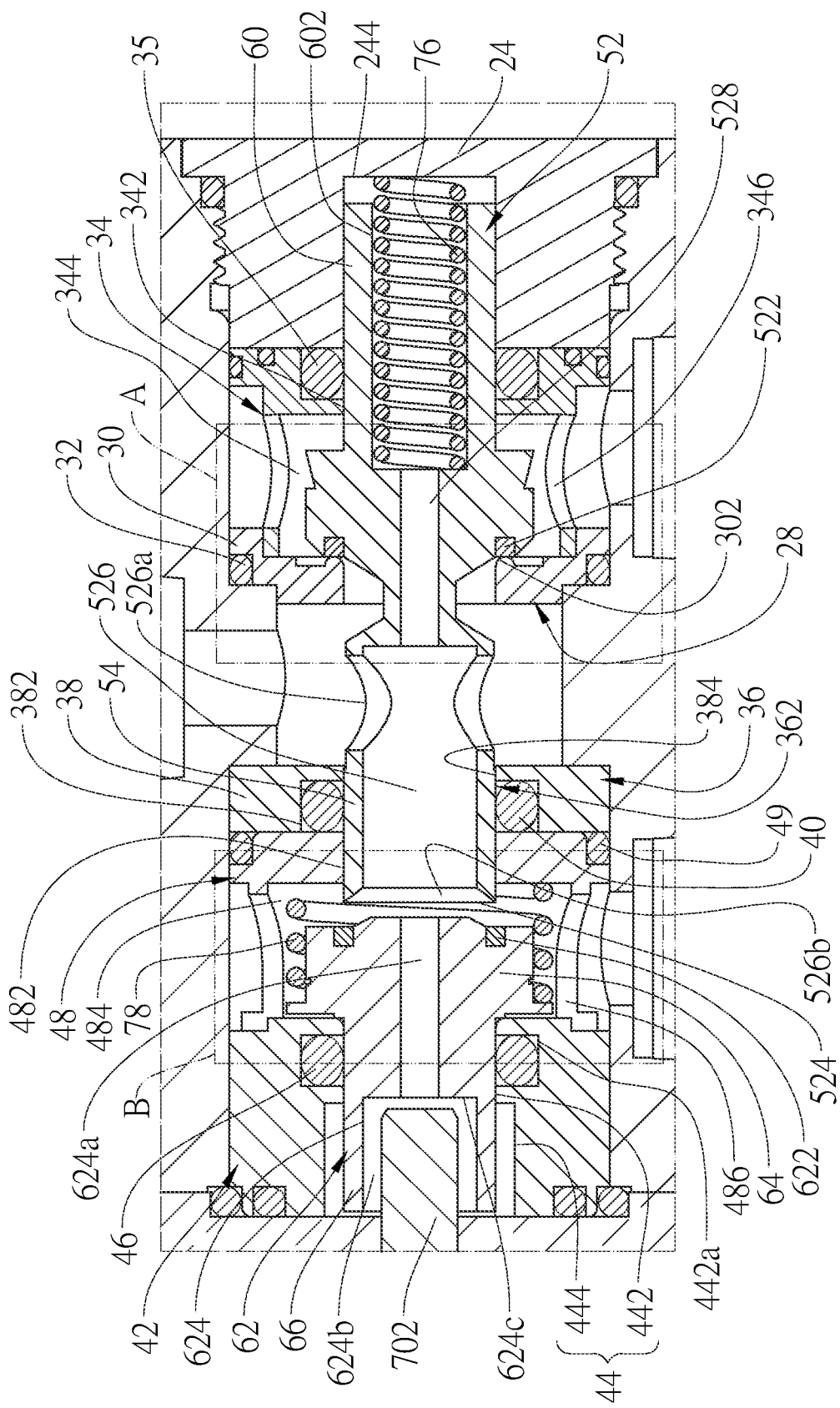
FIG. 9 is an enlarged partial view of a marked region in FIG. 8.
Figure 10:
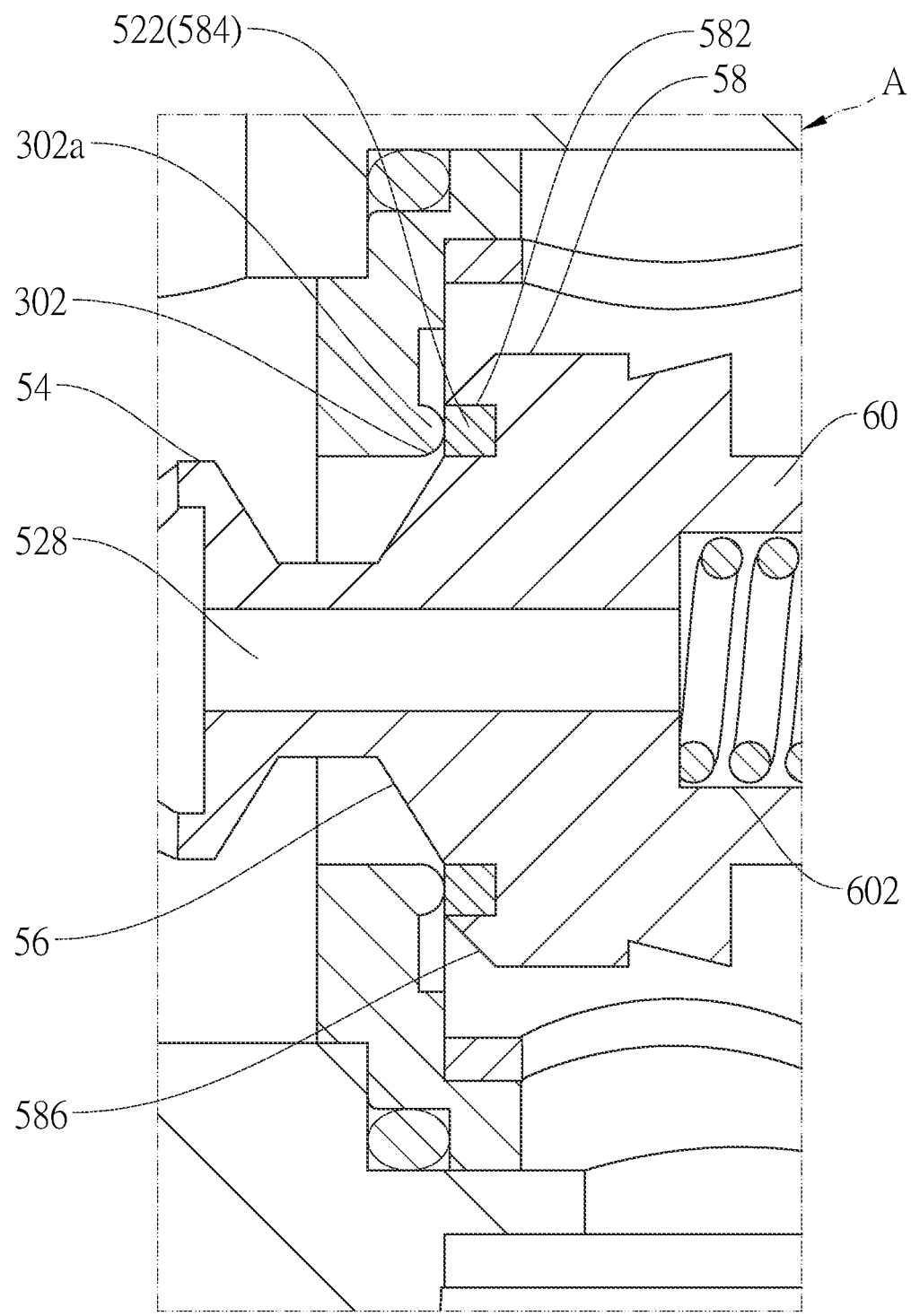
FIG. 10 is an enlarged partial view of a marked region A in FIG. 9.
Figure 11:
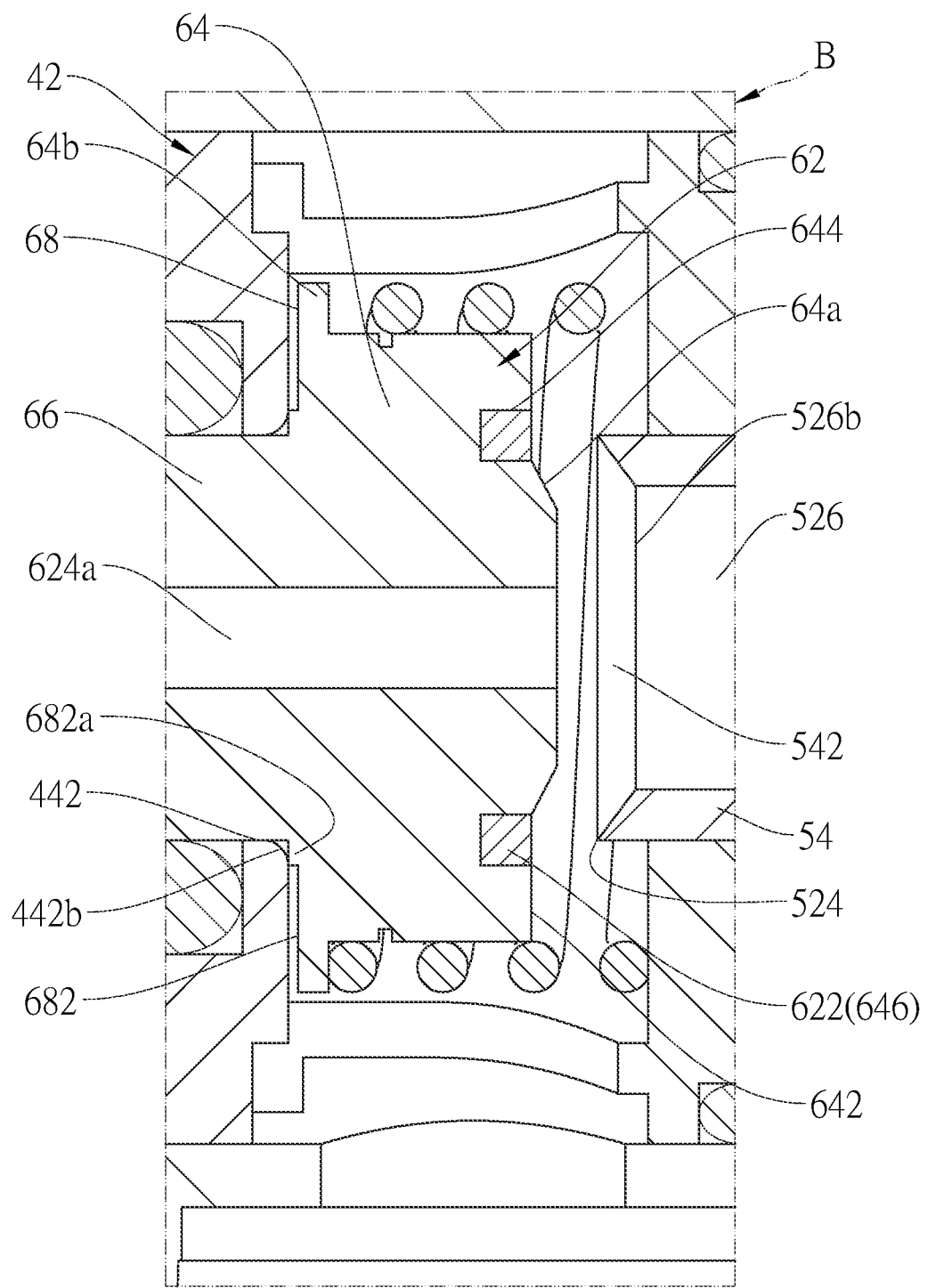
FIG. 11 is an enlarged partial view of a marked region B in FIG. 9.
Figure 12:
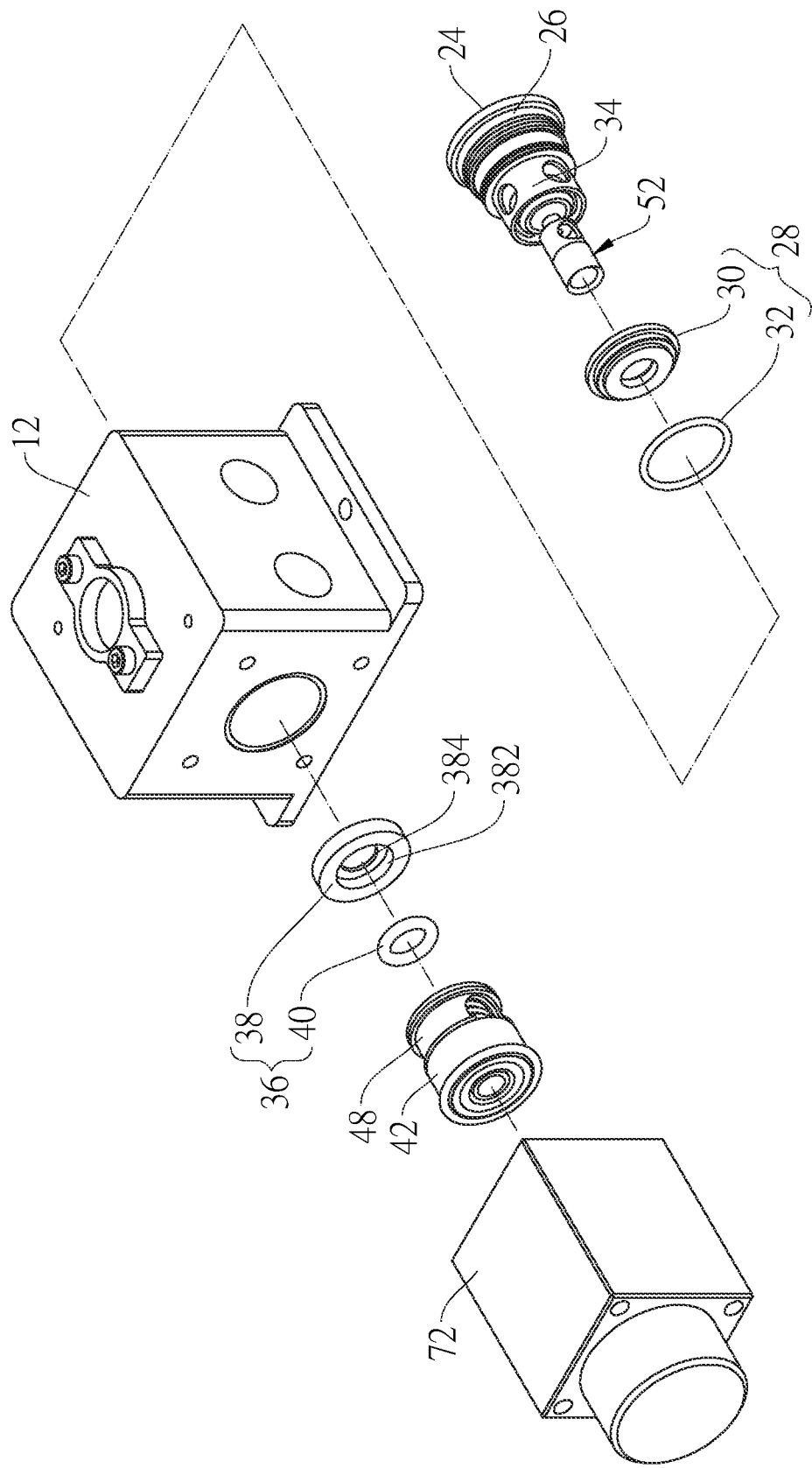
FIG. 12 is a partially exploded view of the fluid pressure proportional valve of the first embodiment according to the present invention.
Figure 13:
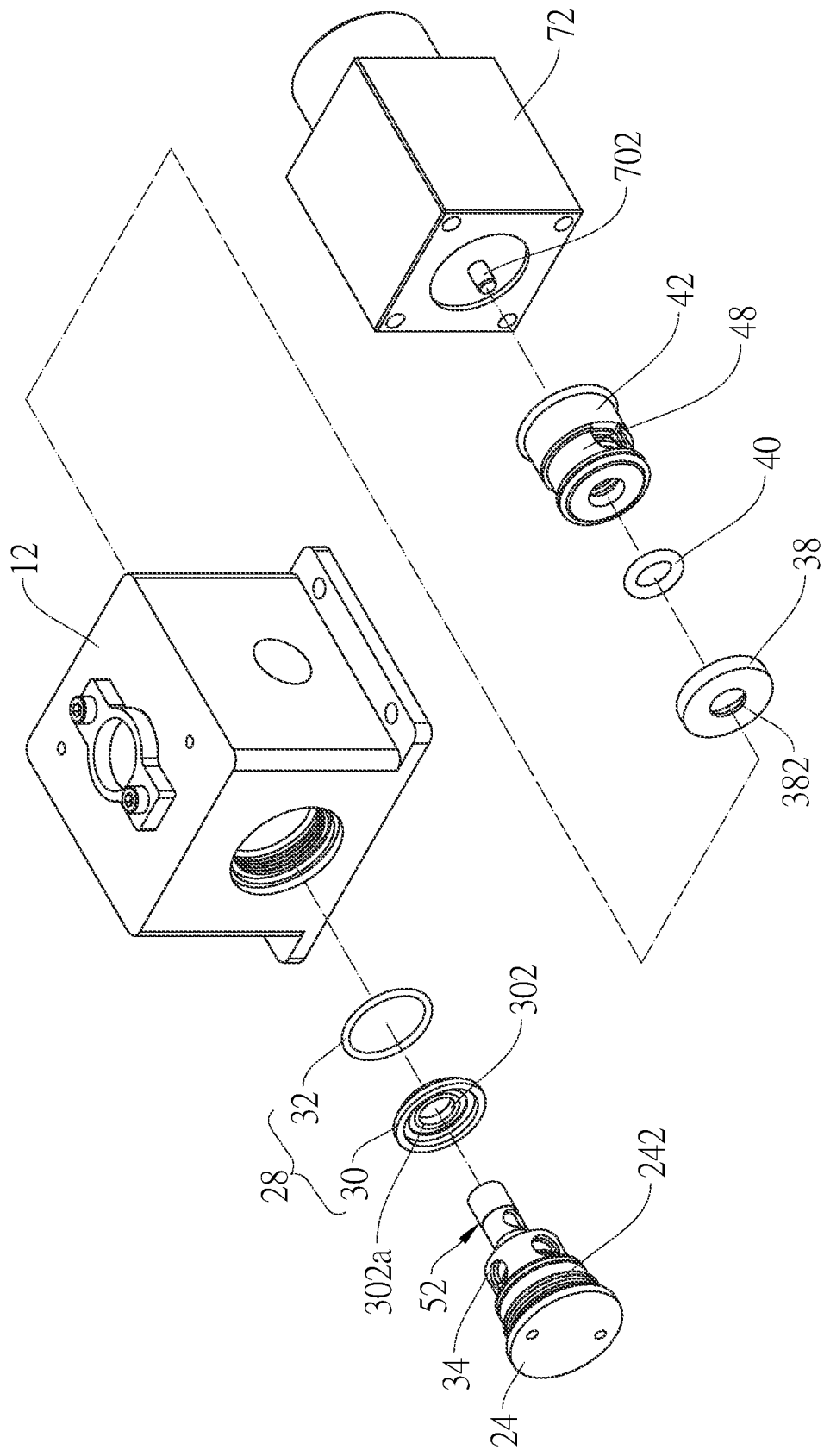
FIG. 13 is a partially exploded view of the fluid pressure proportional valve of FIG. 12 seen from another direction.
Figure 14:
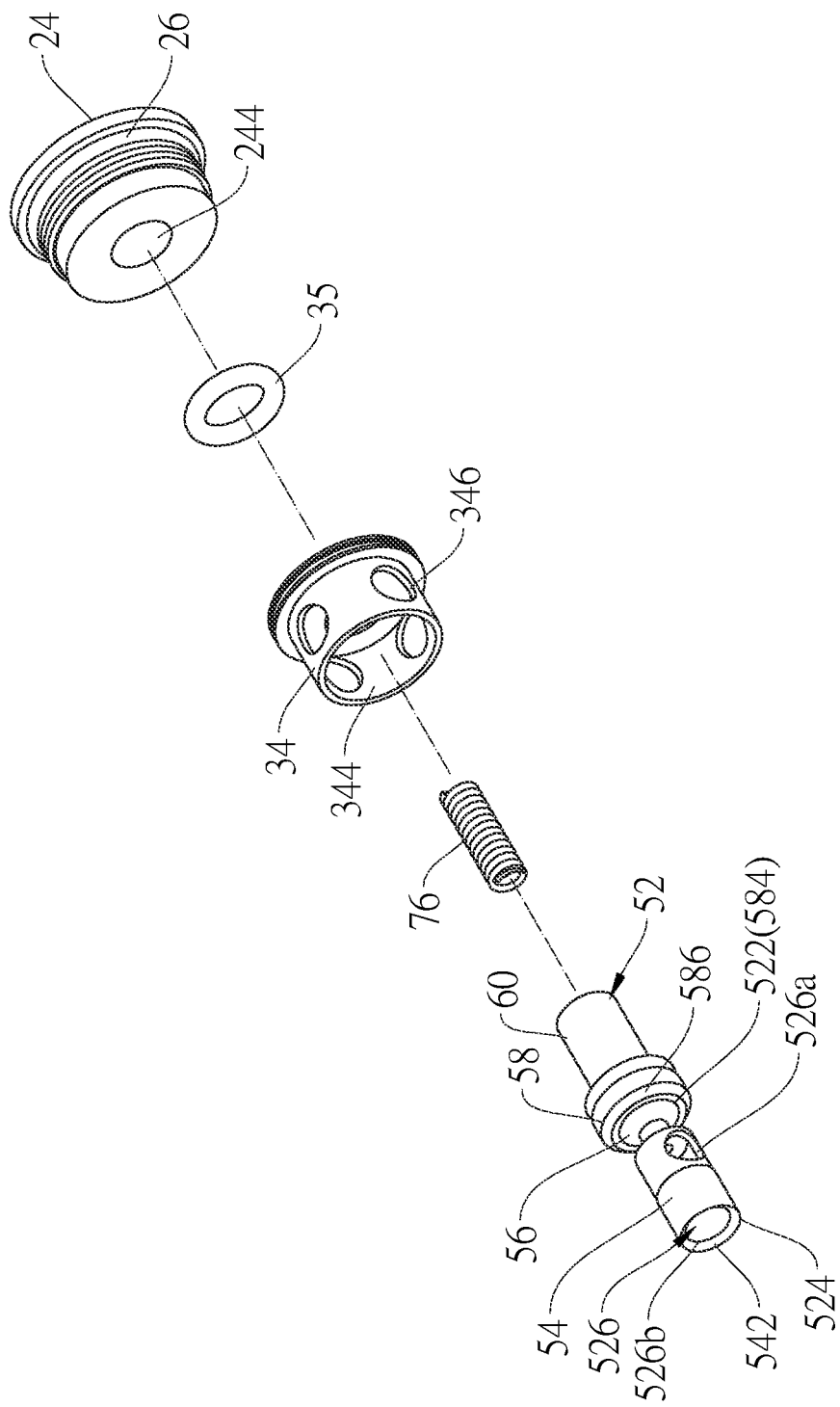
FIG. 14 is a partially exploded view of the fluid pressure proportional valve of the first embodiment according to the present invention.
Figure 15:
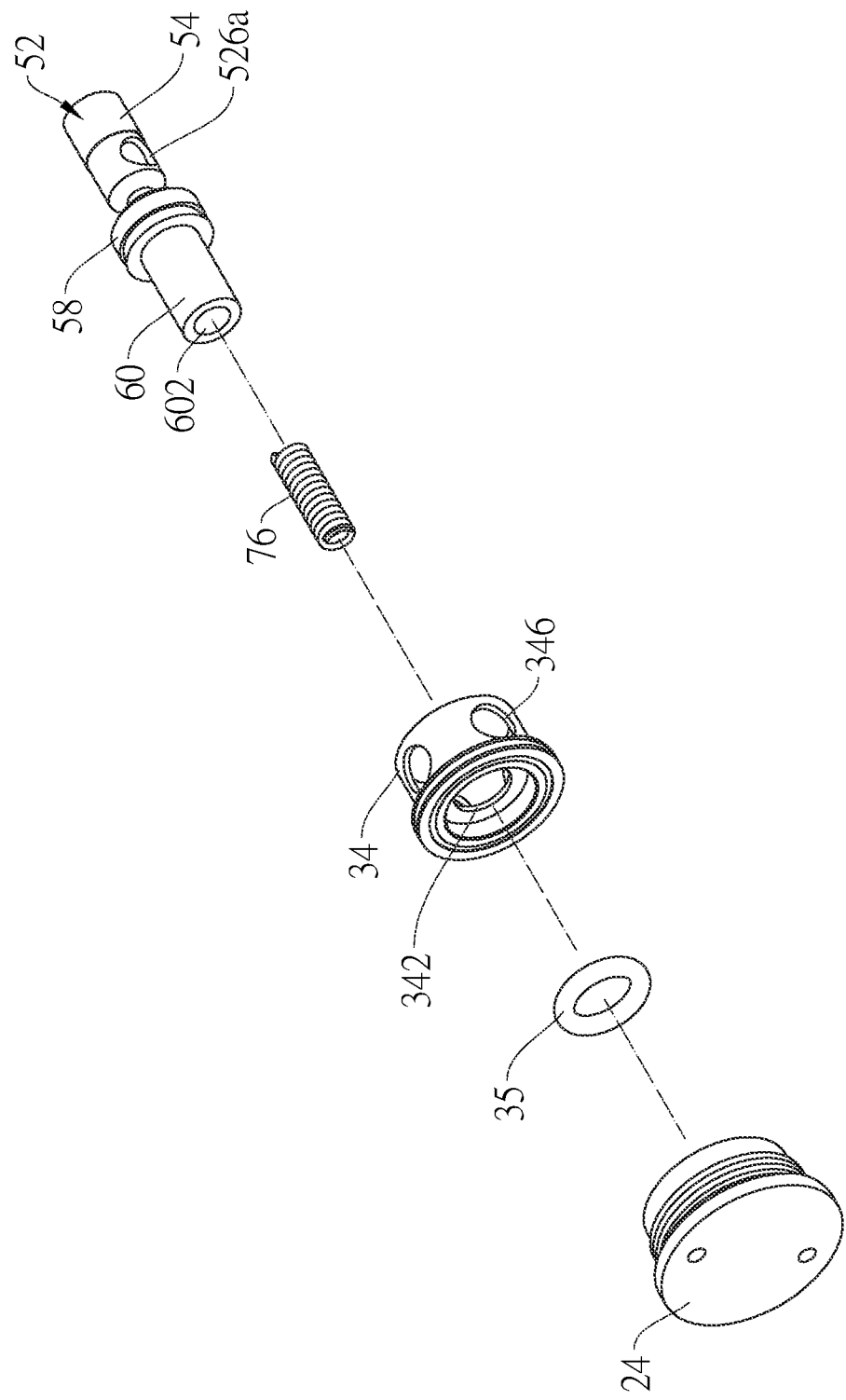
FIG. 15 is a partially exploded view of the fluid pressure proportional valve of FIG. 14 seen from another direction.
Figure 19:
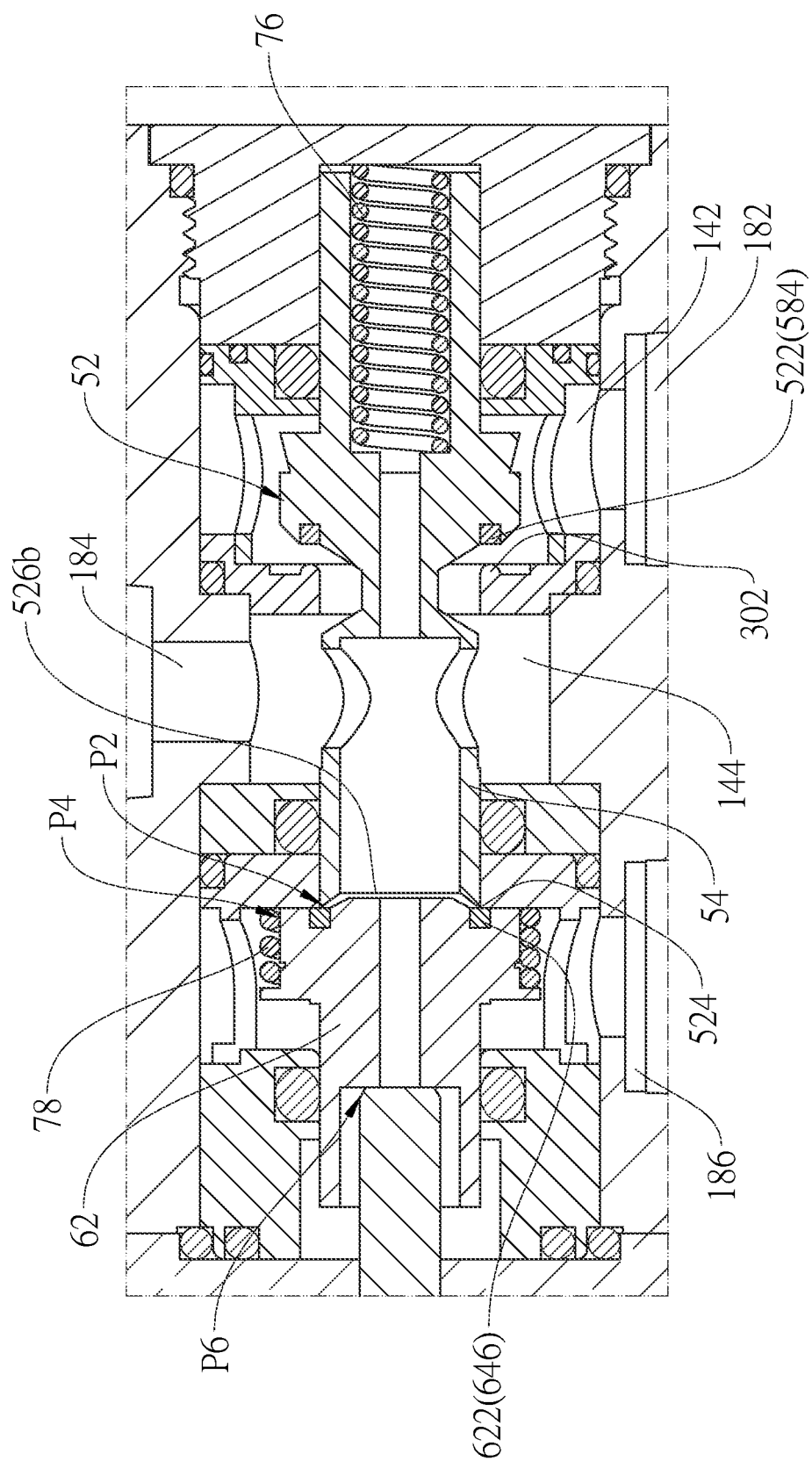
FIG. 19 is similar to FIG. 9, showing the second core shaft is moved to the third position, and the first core shaft is moved to the second position; and, FIG. 20 is similar to FIG. 5, showing the fluid pressure proportional valve of a second embodiment according to the present invention.

The first core shaft 52 is located in the receiving space 14 of the valve body 10 and could move between a first position P1 (as shown in FIG. 9) and a second position P2 (as shown in FIG. 19) along the axial direction X. The first core shaft 52 has a sealing portion 522 and an abutting portion 524. The sealing portion 522 is located at the first space 142. The abutting portion 524 is located at the second space 144. When the first core shaft 52 is located at the first position P1, the sealing portion 522 abuts against and the valve port 302 (as shown in FIG. 10). The abutting portion 524 could be pushed to drive the first core shaft 52 to move to the second position P2 along the axial direction X toward a first direction D1. During the process of moving, the sealing portion 522 is gradually moved away from the valve port 302, so that the sealing portion 522 gradually departs from the valve port 302 to progressively open the valve port 302. When the first core shaft 52 is moved to the second position P2, an open degree of the valve port 302 is maximum. With such design, by controlling a moving distance of the first core shaft 52 along the axial direction X, the open degree of the valve port 302 could be changed, thereby changing a volume of the fluid flowing through the valve port 302.

The first core shaft 52 has a flow channel 526, wherein at least one first opening 526a of the flow channel 526 communicates with the second space 144. A second opening 526b of the flow channel 526 communicates with the third space 146 in a way that the communication therebetween could be operably blocked.

In the current embodiment, the first core shaft 52 sequentially has a communicating section 54, a tapered section 56, a sealing section 58, and a straight rod section 60 along the axial direction X. The communicating section 54 has the flow channel 526, wherein the flow channel 526 forms two first openings 526a on a circumference of the communicating section 54. The flow channel 526 forms the second opening 526b at an end of the communicating section 54. The abutting portion 524 is located at a circumference of the second opening 526b. The circumference of the second opening 526b forms a tapered hole 542. The communicating section 54 is movably inserted through the perforation 362 of the second sealing member 36, and the circumference of the communicating section 54 tightly abuts against a hole wall of the perforation 362. More specifically, the circumference of the communicating section 54 tightly abuts against the inner ring of the O-ring 40.

An end of the tapered section 56 where an outer radius of the tapered section 56 is smaller is connected to an end of the communicating section 54 where an outer radius of the communicating section 54 is greater at the sealing section 58. When the first core shaft 52 is located at the first position P1, the tapered section 56 passes through the sealing section 58. When the first core shaft 52 moves toward the first direction D1 to leave away from the first position P1, the tapered section 56 gradually leaves away from the valve port 302.

The sealing section 58 is located in the first space 142 and has an annular groove 582, wherein a rubber ring 584 is firmly fixed to the annular groove 582. For example, the rubber ring 584 is fixed to the annular groove 582 in a way of sintering. The rubber ring 584 constitutes the sealing portion 522. The rubber ring 584 could abut against the protruding edge of the valve port 302 to enhance the tightness. An outer radius of the sealing section 58 is gradually increased from the annular groove 582 in a direction away from the annular groove 582 (namely the first direction D1), and a circumference of the sealing section 58 forms a conical surface 586 that could reduce the resistance against the fluid passing through the valve port 302.

The straight rod section 60 is connected to the sealing section 58 and is movably inserted through the shaft bore 342 of the first shaft seat 34, wherein a part of the straight rod section 60 is inserted into the cavity 244. A depth of the cavity 244 could decide a maximum movable distance of the first core shaft 52. The straight rod section 60 has a sinkhole 602 which is formed by recessing into an end of the straight rod section 60 along the axial direction X. Besides, since the straight rod section 60 of the first core shaft 52 is supported by the first shaft seat 34 and the communicating section 54 of the first core shaft 52 is supported by the second sealing member 36, the first core shaft 52 could steadily and straightly move along the axial direction X between the first position P1 and the second position P2, without inclining.

Additionally, the first core shaft 52 has a communicating channel 528, wherein the communicating channel 528 penetrates through an inner end of the sinkhole 602 and an inner end of the flow channel 526. The communicating channel 528 communicates with the flow channel 526 and the sinkhole 602. The communicating channel 528 could balance a pressure of the communicating section 54 and the pressure of the cavity 244 to facilitate a movement of the first core shaft 52, thereby avoid the resistance against the movement due to a pressure difference between two ends of the first core shaft 52.

The first core shaft 52 is connected to a first elastomer which is a first spring 76 as an example. In the current embodiment, the first spring 76 is located between the sinkhole 602 of the first core shaft 52 and the cavity 244 of the seal cap 24. An end of the first spring 76 abuts against an inner end of the sinkhole 602, and another end abuts against an inner end of the cavity 244. The first spring 76 is adapted to provide a resilience toward a second direction D2, so that the first core shaft 52 could naturally be located at the first position P1, wherein the second direction D2 is opposite to the first direction D1.

Figure 8:
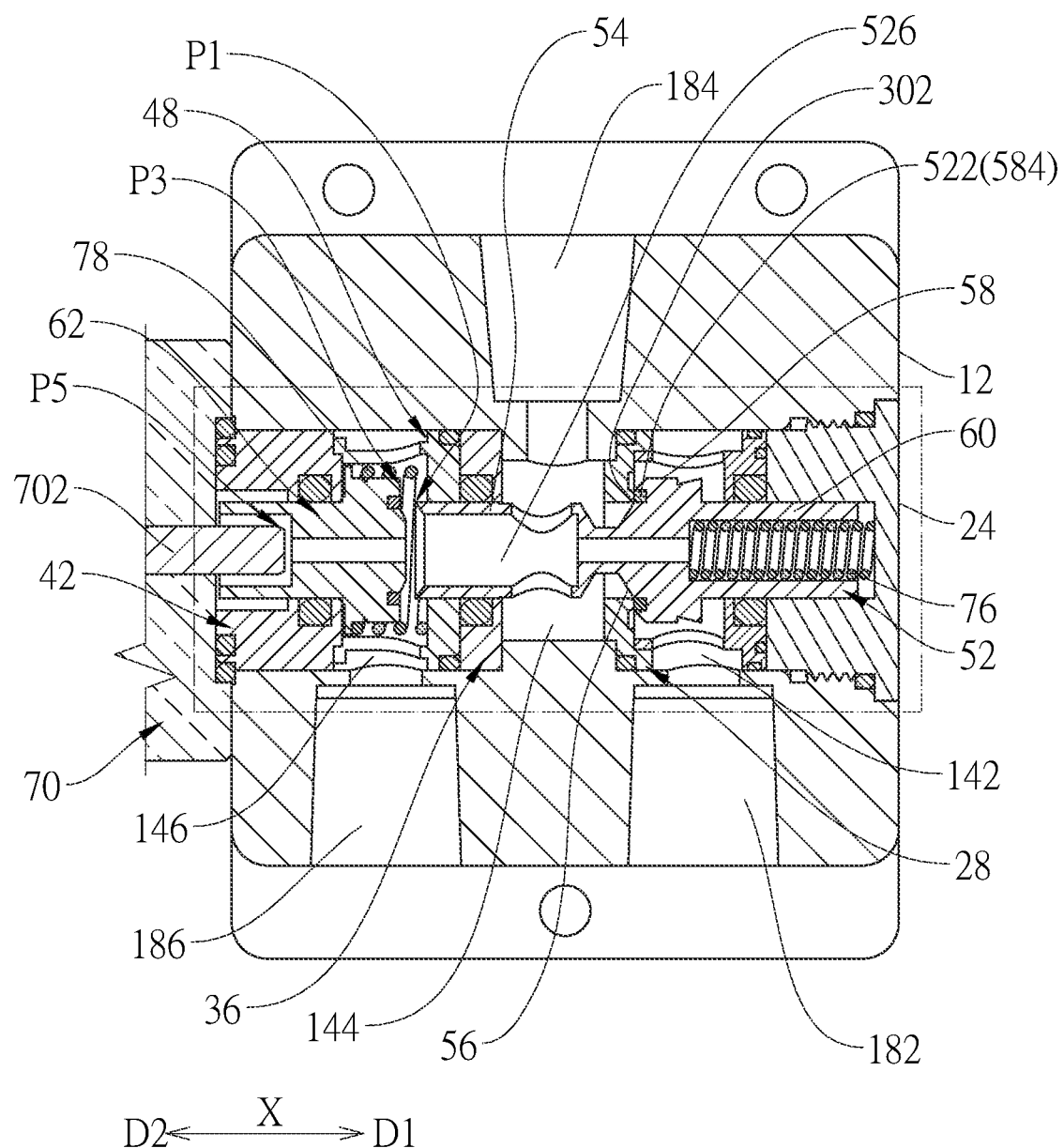
FIG. 8 is a sectional view taken along the 8-8 line in FIG. 7.

The second core shaft 62 is located at the receiving space 14 of the valve body 10 and could move between a third position P3 (as shown in FIG. 8) and a fourth position P4 (as shown in FIG. 19) along the axial direction X. The second core shaft 62 has a pushing portion 622. When the second core shaft 62 is located at the third position P3, the second opening 526b of the flow channel 526 communicates with the third space 146. When the second core shaft 62 is located at the fourth position P4, the second core shaft 62 blocks the second opening 526b, and the pushing portion 622 of the second core shaft 62 pushes the abutting portion 524 of the first core shaft 52 to drive the first core shaft 52 to move to the second position P2.

In the current embodiment, the second core shaft 62 has a first section 64 and a second section 66. An outer radius of the first section 64 is greater than an outer radius of the second section 66. The first section 64 is located in the spring seat 48. The second section 66 is movably inserted through the shaft bore 44 of the second shaft seat 42. A circumference of the second section 66 is tightly fitted around by the O-ring 46 of the shaft bore 44 of the second shaft seat 42 to form a tight closure.

The first section 64 of the second core shaft 62 has an end surface 642 which faces communicating section 54 of the first core shaft 52. An annular groove 644 is formed by recessing into the end surface 642, wherein the annular groove 644 is firmly disposed with a rubber ring 646 which could not be detached. For example, the rubber ring 646 is fixed to the annular groove 644 in a way of sintering. The rubber ring 646 constitutes the pushing portion 622 for pushing the abutting portion 524 of the first core shaft 52, thereby increasing the tightness between the first section 64 and the second opening 526b. The first section 64 of the second core shaft 62 has a tapered section 64a which is located within a region encircled by the rubber ring 646. The tapered section 64a faces toward the second opening 526b of the first core shaft 52.

A joint site between the first section 64 and the second section 66 forms a shoulder 68, wherein the shoulder 68 has an end surface 682. The end surface 682 faces toward the second shaft seat 42 and protrudes in a direction toward the second shaft seat 42 to form an annular protrusion 682a. The annular protrusion 682a is close to the bore edge 442b of the shaft bore 44 of the second shaft seat 42. As illustrated in FIG. 8 to FIG. 11, when the second core shaft 62 is located at the third position P3, the annular protrusion 682a abuts against a curved surface of the bore edge 442b of the second shaft seat 42, so that a gap is formed between the end surface 682 of the shoulder 68 and the second shaft seat 42. A contact area between the annular protrusion 682a and the bore edge 442b are small, so that the second core shaft 62 could be easily pushed to move away from the second shaft seat 42, and the movement of the second core shaft 62 does not be hindered by a pressure generated due to great contact area between the end surface 682 of the shoulder 68 and the second shaft seat 42. In other words, when the end surface 682 and the second shaft seat 42 are contact to each other, the air between the end surface 682 and the second shaft seat 42 does not completely discharge to cause vacuum adsorption, so that the movement of the second core shaft 62 could keep smooth.

The first section 64 is connected to a second elastomer which is a second spring 78 as an example. In the current embodiment, the second spring 78 is located in the spring seat 48, and a circumference of the first section 64 has a flange 64b protruding in a radial direction. An end of the second spring 78 fits around the first section 64 and urges against the flange 64b. Another end of the second spring 78 urges against the spring seat 48. The second spring 78 is adapted to provide a resilience toward the second direction D2 to allow the second core shaft 62 to be located at the third position P3 under a normal status.

The second core shaft 62 has a through hole 624, wherein the through hole 624 communicates two opposite ends of the second core shaft 62 and bores through the second core shaft 62 from the first section 64 to the second section 66, thereby communicating with the flow channel 526 of the first core shaft 52. The through hole 624 could balance pressures of the two ends of the second core shaft 62 to facilitate a movement of the second core shaft 62, thereby avoiding the resistance against the movement due to a pressure difference between the two ends of the second core shaft 62. The through hole 624 includes a first section 624a and a second section 624b, wherein a hole diameter of the second section 624b is greater than a hole diameter of the first section 624a. A joint site between the second section 624b and the first section 624a forms a shoulder 624c.

The driving motor 70 is disposed at a side of the valve body 10, and two 0-rings 72 are disposed between the driving motor 70 and the second shaft seat 42 to allow the driving motor 70 tightly abutting against the second shaft seat 42. The driving motor 70 has a driving shaft 702, wherein the second core shaft 62 could be moved as the driving shaft 702 moves, so that the second core shaft 62 is driven to move from the third position P3 to the fourth position P4. The driving motor 70 is a voice coil motor (VCM) as an example. The driving motor 70 has a magnet and a coil inside, wherein the coil receives an electric current to interact with the magnet to drive the driving shaft to move between a fifth position P5 (as shown in FIG. 8) and a sixth position P6 (as shown in FIG. 19) along the axial direction X. When the driving shaft 702 is located in the fifth position P5, an end portion of the driving shaft 702 could keep apart from or contact with the second core shaft 62. The end portion of the driving shaft 702 keeps apart from the second core shaft 62 could enhance the accuracy of the activation of the fluid pressure proportional valve 1 and avoid the false activation due to working errors of the second core shaft 62. In the current embodiment, the driving shaft 702 is inserted into the second section 624b of the through hole 624 of the second core shaft 62. A gap remains between the end portion of the driving shaft 702 and the shoulder 624c of the through hole 624, and a gap remains between a circumference the driving shaft 702 and a hole wall of the second section 66 of the second core shaft 62, wherein the two gaps communicate with the first section 624a.

When the driving shaft 702 is moved toward the sixth position P6 in the first direction D1, the driving shaft 702 pushes the second core shaft 62 from the third position P3 to the fourth position P4, thereby pushing the first core shaft 52 from the first position P1 to the second position P2. When the driving shaft 702 is moved toward the second direction D2, the driving shaft 702 could return to the fifth position P5. By using the voice coil motor (VCM), the driving shaft 702 could be moved linearly and faster. A movement and a moving distance of the driving shaft 702 could be controlled by regulating a direction and an intensity of the electric current, so that the driving shaft 702 could drive the second core shaft 62 and the first core shaft 52 to move faster.

In an embodiment, the driving shaft 702 could be connected to the second core shaft 62. When the driving shaft 702 is moved to the sixth position P6 along the second direction D2, the second core shaft 62 is driven to move along the second direction D2.

In an embodiment, the driving motor 70 is not a voice coil motor (VCM). The driving motor 70 could be a direct current motor (DC motor), a step motor, and any motor that has a rotating shaft. The rotating shaft combines a screw bushing having an external thread to form the driving shaft. The second core shaft 62 is not rotatable, and the hole wall of the second section 624b is disposed with an internal thread for engaging with the external thread of the screw bushing. The rotating shaft drives the screw bushing to rotate counter-clockwise or clockwise, so that the second core shaft 62 is driven to move between the third position P3 and the fourth position P4 along the axial direction.

In an embodiment, the second opening 526b of the flow channel 526 of the second core shaft 62 could be located at the circumference of the communicating section 54 and between an end of the communicating section 54 and the first opening 526*a*. The first core shaft 52 could have a portion that extends laterally for sealing the second opening 526*b* by contacting with the circumference of the communicating section 54.

Additionally, in the current embodiment, the fluid pressure proportional valve 1 could further include a control box 80 and a control device 82. The control box 80 is engaged with the surface 22 of the valve body 10, wherein the control device 82 is located in the control box 80 and is electrically connected to the pressure sensor 74 and the driving motor 70. The control device 82 control the driving motor 70 according to a pressure value measured by the pressure sensor 74 to drive the driving shaft 702 to move.

With such design, the first orifice 182 could be connected to a fluid supply (not shown), wherein a fluid from the fluid supply could be input through the first orifice 182. The second orifice could be connected to a device (not shown) that a pressure of the device needs to be controlled. The third orifice could be a pressure relief hole. Usage of each of the first orifice, the second orifice, and the third orifice is not limited to the abovementioned. The third orifice could be used for inputting fluid, and the first orifice could be a pressure relief hole.

Figure 16:
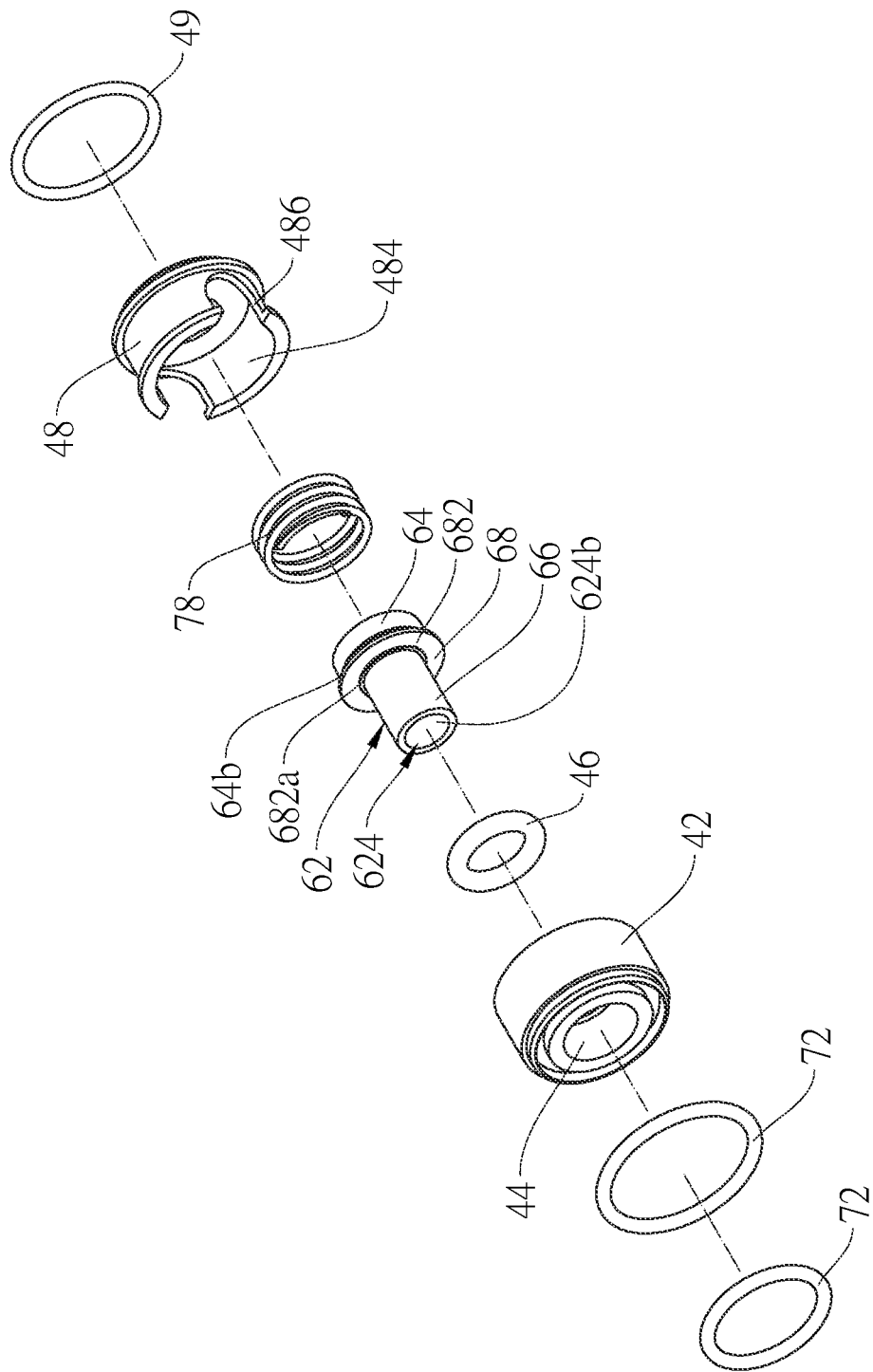
FIG. 16 a partially exploded view of the fluid pressure proportional valve of the first embodiment according to the present invention.
Figure 17:
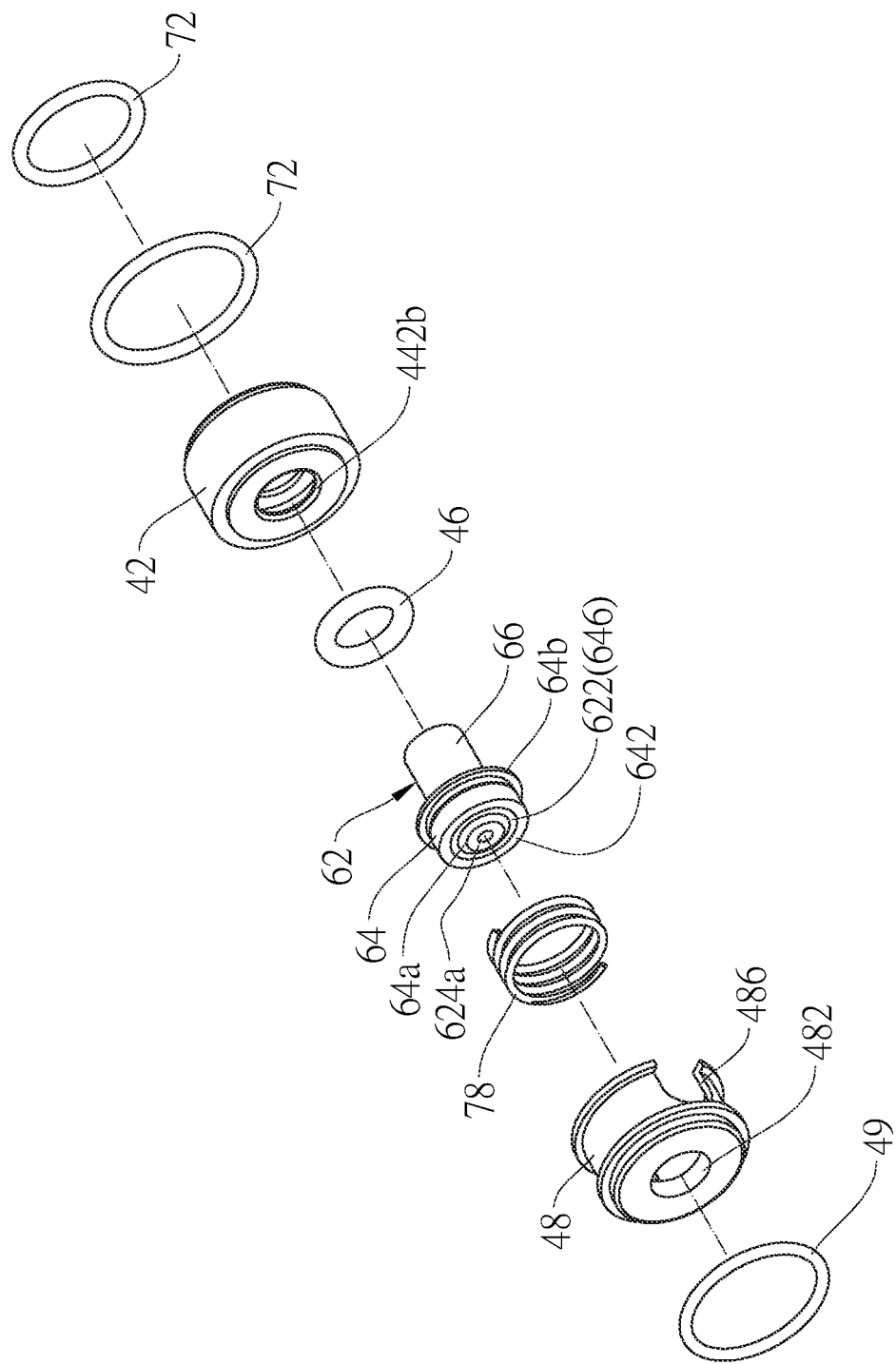
FIG. 17 is a partially exploded view of the fluid pressure proportional valve of FIG. 16 seen from another direction.

As illustrated in FIG. 18, the control device 82 controls the driving motor 70 to move the driving shaft 702 toward the first direction D1 along the axial direction X, thereby pushing the shoulder 624*c* of the through hole 624 of the second core shaft 62 to move the second core shaft 62 from the third position P3 toward the fourth position P4 along the first direction D1. During the movement of the second core shaft 62, the second core shaft 62 is moved to a middle position Pm (as shown in FIG. 16) first, so that the rubber ring 646 of the second core shaft 62 abuts against an end of the communicating section 54 of the first core shaft 52 to block the second opening 526*b*, and the second spring 78 is pressed to compress. The tapered section 64*a* of the second core shaft 62 passes through the tapered hole 542. In case, the axial direction of the second core shaft 62 is tilted relative to the axial direction X, a surface of the tapered hole 542 could guide a surface of the tapered section 64*a* to align the core shaft 62.

As illustrated in FIG. 19, during a process of the driving shaft 702 is moving to the sixth position P6, the second core shaft 62 is constantly blocked the second opening 526*b*. The pushing portion 622 of the second core shaft 62 continuously pushes the abutting portion 524 of the first core shaft 52, so that the rubber ring 584 could be gradually departed from the valve port 302. The first spring 76 and the second spring 78 are pressed to compress.

As illustrated in FIG. 19, when the driving shaft 702 is moved to the sixth position P6, the driving shaft 702 pushes the second core shaft 62 to the fourth position P4, and the second core shaft 62 pushes the communicating section 54 to move the first core shaft 52 to the second position P2, thereby maximizing the open degree of the valve port 302, namely a distance between the sealing portion 522 and the valve port 302 is maximum.

When the sealing portion 522 departs from the valve port 302, the fluid could flow through the first orifice 182 from the fluid supply to the first space 142. Then, the fluid enters the second space 144 through the valve port 302. The fluid in the second space 144 is outputted to the device that the pressure of the device needs to be controlled through the second orifice 184, thereby increasing the pressure of the device. The control device 82 could regulate the position of the second core shaft 62 by controlling the direction and the intensity of the electric current outputting to the driving motor 70 according to the pressure value measured by the pressure sensor 74, so that the distance between the sealing portion 522 and the valve port 302 could be altered, thereby regulating a volume of the fluid that passes through the valve port 302 to adjust a speed of increasing pressure.

When the device needs to relieve pressure, the control device 82 controls the driving motor 70 to move the driving shaft 702 toward the second direction D2 along the axial direction. The second spring 78 urges the second core shaft 62 toward the third position P3, so that the second core shaft 62 is moved toward the middle position Pm and the third position P3 from the fourth position P4. Simultaneously, the first spring 76 urges the first core shaft 52 toward the first position P1, thereby returning to a status as shown in FIG. 8. When the rubber ring 646 of the second core shaft 62 departs from the second opening 526*b* of the first core shaft 52, the device starts to relieve the pressure. The fluid passes through the second orifice 184, the second space 144, the flow channel of the first core shaft 52 and the third space 146 and is released through the third orifice 186. The control device 82 could regulate the position of the second core shaft 62 by controlling the direction and the intensity of the electric current outputting to the driving motor 70 according to the pressure value measured by the pressure sensor 74, so that the distance between the sealing portion 522 and the valve port 302 could be altered, thereby adjusting a speed of reducing pressure.

Figure 20:
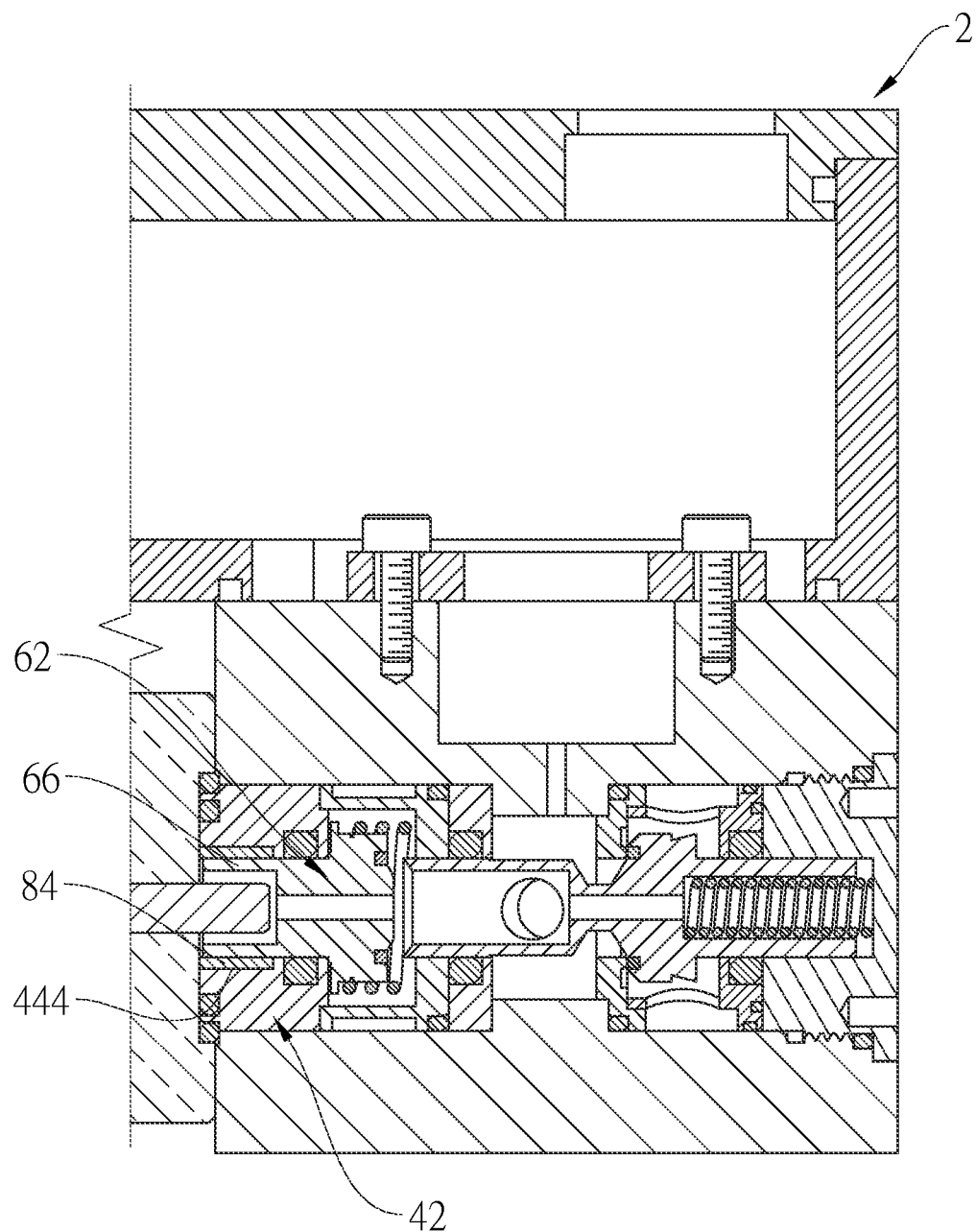

As illustrated in FIG. 20, a fluid pressure proportional valve 2 of a second embodiment according to the present invention has almost the same structure as that of the first embodiment, except that the fluid pressure proportional valve 2 further including a bushing 84, wherein the bushing 84 is disposed in the second section 444 of the second shaft seat 42, and the circumference of the second section 66 of the second core shaft 62 movably abuts against an inner circumference of the bushing 84, thereby enhancing the stability of movement of the second core shaft 62 along the axial direction X.

The fluid pressure proportional valve of the present invention merely has one driving motor to drive the second core shaft and the first core shaft to change pathways of the fluid, thereby improving the inconvenience of controlling multiple solenoid valves to shift the pathways of the fluid.

It must be pointed out that the embodiment described above is only a preferred embodiment of the present invention. All equivalent structures which employ the concepts disclosed in this specification and the appended claims should fall within the scope of the present invention.

What is claimed is:

1. A fluid pressure proportional valve, comprising:
a valve body having a receiving space, a first orifice, a second orifice, and a third orifice; the receiving space comprises a first space, a second space, and a third space which are distributed along an axial direction; the first orifice communicates with the first space; the second orifice communicates with the second space; the third orifice communicates with the third space; the receiving space has a valve port which is located between the first space and the second space;
a first core shaft located in the receiving space of the valve body and is movable between a first position and a second position along the axial direction; the first core shaft has a sealing portion and an abutting portion; the sealing portion is located at the first space; the abutting portion is located at the second space; when the first core shaft is located at the first position, the sealing portion abuts against and closes the valve port; the abutting portion is pushed to drive the first core shaft to move to the second position; when the first core shaft is located at the second position, the sealing portion departs from the valve port to open the valve port; the first core shaft has a flow channel, and a first opening of the flow channel communicates with the second space; a second opening of the flow channel communicates with the third space in a way that is able to be blocked;

a second core shaft located at the receiving space of the valve body and movable between a third position and a fourth position along the axial direction, wherein the second core shaft has a pushing portion; when the second core shaft is located at the third position, the second opening of the flow channel communicates with the third space; when the second core shaft is located at the fourth position, the second core shaft blocks the second opening, and the pushing portion of the second core shaft pushes the abutting portion of the first core shaft to drive the first core shaft to move to the second position; and, a driving motor engaged with the valve body and having a driving shaft, wherein the driving shaft drives the second core shaft to move from the third position to the fourth position.

2. The fluid pressure proportional valve as claimed in claim 1, comprising a first elastomer connected to the first core shaft, wherein when the first core shaft is moved from the first position to the second position, the first elastomer is compressed; when the second core shaft is moved from the fourth position to the third position, the first elastomer urges the first core shaft toward the first position.

3. The fluid pressure proportional valve as claimed in claim 2, comprising a second elastomer connected to the second core shaft, wherein when the second core shaft is moved from the third position to the fourth position, the second elastomer is compressed; when the second core shaft is moved from the fourth position to the third position, the second elastomer pushes the second core shaft toward the third position.

4. The fluid pressure proportional valve as claimed in claim 3, wherein when the driving shaft is moved toward the first direction, the second core shaft is moved from the third position toward the fourth position along the first direction; when the driving shaft is moved toward a second direction which is opposite to the first direction, the second elastomer urges the second core shaft toward the third position.

5. The fluid pressure proportional valve as claimed in claim 4, wherein the driving motor is a voice coil motor (VCM).

6. The fluid pressure proportional valve as claimed in claim 1, wherein the first core shaft has a sealing section that is located in the first space and has an annular groove; the annular groove is fixedly disposed with a rubber ring, wherein the rubber ring constitutes the sealing portion; a peripheral portion of the valve port has a protruding edge, and the protruding edge is adapted to abut against the rubber ring.

7. The fluid pressure proportional valve as claimed in claim 6, wherein an outer radius of the sealing section is gradually increased in a direction away from the annular groove to form a conical surface.

8. The fluid pressure proportional valve as claimed in claim 1, wherein the first core shaft has a communicating section having the flow channel, and the flow channel forms the first opening on a circumference of the communicating section; the flow channel forms the second opening at another end of the communicating section; the abutting portion is located at a circumference of the second opening; when the second core shaft is located at the fourth position, the pushing portion blocked the second opening.

9. The fluid pressure proportional valve as claimed in claim 8, wherein a sealing member is disposed in the receiving space of the valve body; the sealing member is located between the second space and the third space; the sealing member has a perforation; the communicating section is movably inserted through the perforation, a hole wall of the perforation abuts against the circumference of the communicating section.

10. The fluid pressure proportional valve as claimed in claim 8, wherein during a process of the second core shaft being moved from the third position to the fourth position, the pushing portion abuts against an end of the communicating section to block the second opening, and then pushes the communicating section to move the first core shaft from the first position to the second position.

11. The fluid pressure proportional valve as claimed in claim 8, wherein the second core shaft has an end surface face toward the communicating section of the first core shaft; the annular groove is formed by recessing into the end surface, and the annular groove is fixedly disposed with a rubber ring, wherein the rubber ring constitutes the pushing portion.

12. The fluid pressure proportional valve as claimed in claim 8, wherein the circumference of the second opening of the first core shaft forms a tapered hole; the second core shaft has a tapered section; during a process that the second core shaft is moved from the third position to the fourth position, the tapered section is inserted into the tapered hole.

13. The fluid pressure proportional valve as claimed in claim 1, wherein a shaft seat is disposed in the receiving space and has a shaft bore; the second core shaft has a first section and a second section, wherein an outer radius of the first section is greater than an outer radius of the second section, so that the second section of the second core shaft is movably inserted through the shaft bore of the shaft seat; a joint site between the first section and the second section forms a shoulder, wherein the shoulder has an end surface; the end surface of the shoulder faces toward the shaft seat and protrudes in a direction toward the second shaft seat to form an annular protrusion; when the second core shaft is located at the third position, the annular protrusion abutted against the shaft seat, so that a gap is formed between the end surface and the shaft seat.

14. The fluid pressure proportional valve as claimed in claim 13, wherein the shaft bore has a bore edge; the bore edge is close to the first section and has a curved surface; when the second core shaft is located at the third position, the annular protrusion abuts against the curved surface of the bore edge.

15. The fluid pressure proportional valve as claimed in claim 2, wherein a shaft seat is disposed in the receiving space and has a shaft bore; the first core shaft has a straight rod section; the straight rod section is movably inserted through the shaft bore of the first shaft seat and has a sinkhole which is formed by recessing into an end of the straight rod section along the axial direction; the first elastomer is located in the sinkhole; the first core shaft has a communicating channel that communicates with the flow channel and the sinkhole.

16. The fluid pressure proportional valve as claimed in claim 15, wherein the valve body comprises a seal cap that is located at a side of the shaft seat and has a cavity; a part of the straight rod section is inserted into the cavity; an end of the first elastomer abuts against an inner end of the sinkhole, and another end of the first elastomer abuts against an inner end of the cavity.

17. The fluid pressure proportional valve as claimed in claim 3, wherein the second core shaft has a through hole, wherein the through hole communicates with two opposite ends of the second core shaft, and the through hole communicates with the flow channel of the first core shaft.

18. The fluid pressure proportional valve as claimed in claim 17, wherein the through hole comprises a first section and a second section; a hole diameter of the second section is greater than a hole diameter of the first section; a joint site between the second section and the first section forms a shoulder; the driving shaft is inserted into the second section of the through hole, and a gap is formed between a circumference of the driving shaft and a hole wall of the second section; the driving shaft is moved to push the shoulder in a first direction along the axial direction, thereby moving the second core shaft from the third position to the fourth position; the driving shaft is moved in a second direction that is opposite the first direction, the second elastomer urges the second core shaft toward the third position.

19. The fluid pressure proportional valve as claimed in claim 3, wherein the receiving space is disposed with a spring seat and a shaft seat; the shaft seat has a shaft bore; the second core shaft has a first section and a second section; an outer radius of the first section of the second core shaft is greater than an outer radius of the second section thereof; the first section is located in the spring seat, and the second section is movably inserted through the shaft bore of the shaft seat; the second elastomer is a spring, and the spring is located in the spring seat; an end of the spring fits around the first section, and another end of the spring abuts against the spring seat.

20. The fluid pressure proportional valve as claimed in claim 1, wherein the valve body comprises a capacitive chamber, the capacitive chamber communicates with the second space, and the capacitive chamber has an opening, the opening is formed on a surface of the valve body; a pressure sensor is disposed in the capacitive chamber through the opening; a fastener is engaged with the surface of the valve body and is located at the opening, the fastener abuts against the pressure sensor; a control box is engaged with the surface of the valve body, and a control device is located in the control box and is electrically connected to the pressure sensor and the driving motor; the control device controls the driving motor according to the pressure value measured by the pressure sensor to move the second core shaft by the driving shaft.

* * * * *